(12) United States Patent
Park et al.

(10) Patent No.: US 11,087,500 B2
(45) Date of Patent: Aug. 10, 2021

(54) IMAGE ENCODING/DECODING METHOD AND APPARATUS

(71) Applicant: University-Industry Cooperation Group of Kyung Hee University, Yongin-si (KR)

(72) Inventors: Gwang Hoon Park, Seongnam-si (KR); Dae Young Lee, Ansan-si (KR); Tae Hyun Kim, Hwaseong-si (KR)

(73) Assignee: University-Industry Cooperation Group of Kyung Hee University, Yongin-si (KR)

( * ) Notice: Subject to any disclaimer, the term of this patent is extended or adjusted under 35 U.S.C. 154(b) by 158 days.

(21) Appl. No.: 16/354,291

(22) Filed: Mar. 15, 2019

(65) Prior Publication Data
US 2019/0325615 A1 Oct. 24, 2019

(30) Foreign Application Priority Data

Mar. 15, 2018 (KR) .......... 10-2018-0030512
Mar. 30, 2018 (KR) .......... 10-2018-0037700
Mar. 14, 2019 (KR) .......... 10-2019-0029512
Mar. 14, 2019 (KR) .......... 10-2019-0029515

(51) Int. Cl.
*G06T 9/40* (2006.01)
*H04N 19/573* (2014.01)
*H04N 19/54* (2014.01)
*H04N 19/61* (2014.01)

(52) U.S. Cl.
CPC .............. *G06T 9/40* (2013.01); *H04N 19/54* (2014.11); *H04N 19/573* (2014.11); *H04N 19/61* (2014.11)

(58) Field of Classification Search
CPC ................................... H04N 19/527
See application file for complete search history.

(56) References Cited

U.S. PATENT DOCUMENTS

| | | | | |
|---|---|---|---|---|
| 2010/0215101 A1* | 8/2010 | Jeon | ...... | H04N 19/523 375/240.12 |
| 2012/0044322 A1* | 2/2012 | Tian | ...... | H04N 19/597 348/43 |
| 2012/0314027 A1* | 12/2012 | Tian | ...... | H04N 19/172 348/43 |
| 2013/0229485 A1* | 9/2013 | Rusanovskyy | ...... | H04N 19/52 348/43 |
| 2013/0315308 A1* | 11/2013 | Sugio | ...... | H04N 19/44 375/240.14 |
| 2019/0327463 A1* | 10/2019 | Zhao | ...... | H04N 19/103 |

* cited by examiner

Primary Examiner — Clifford Hilaire
(74) Attorney, Agent, or Firm — NSIP Law

(57) ABSTRACT

The present invention relates to an image encoding/decoding method and apparatus. A method of decoding an image according to an exemplary embodiment of the present invention comprises: decoding transformation information; creating at least one transformed reference picture by applying the transformation information to at least one reference picture organized in a reference picture list; inserting the at least one transformed reference picture into the reference picture list; and performing motion compensation by using the reference picture list.

4 Claims, 31 Drawing Sheets

(a) Motion vector derivation when linear motion occurs (b) Motion vector derivation when non-linear motion occurs (a) Rotation  (b) Zoom-in

IMAGE ENCODING/DECODING METHOD AND APPARATUS

CROSS REFERENCE TO RELATED APPLICATION

The present application claims priority to Korean Patent Application Nos. 10-2018-0030512 (filed Mar. 15, 2018), 10-2018-0037700 (filed Mar. 30, 2018), 10-2019-0029512 (filed Mar. 14, 2018), and 10-2019-0029515 (filed Mar. 14, 2019), the entire contents of which is incorporated herein for all purposes by this reference.

BACKGROUND OF THE INVENTION

Technical Field

The present invention relates to an image encoding/decoding method and apparatus. More particularly, the present invention relates to an image encoding/decoding method and apparatus using a transformed picture as a reference picture.

Description of the Related Art

Recently, demands for multimedia data such as a video have rapidly increased on the Internet. However, the rate at which a bandwidth of a channel develops is difficult keep up with the amount of multimedia data that is also rapidly increasing. As part of this trend, the Video Coding Expert Group (VCEG) of ITU-T and the Moving Picture Expert Group (MPEG) of ISO/IEC, which is the International Organization for Standardization, study video compression standards through steady collaborative research.

SUMMARY OF THE INVENTION

Disclosure

Technical Problem

One object of the present invention is to provide an image encoding/decoding method and apparatus capable of improving compression efficiency by using a transformed picture as a reference picture.

Another object of the present invention is to provide an image encoding/decoding method and apparatus capable of improving compression efficiency by eliminating duplicate information during prediction of an image signal.

A further object of the present invention is to provide a recording medium in which a bitstream created by an image encoding method or apparatus according to the present invention is stored.

It is to be understood that technical problems to be solved by the present invention are not limited to the aforementioned technical problems and other technical problems which are not mentioned will be apparent from the following description to a person with an ordinary skill in the art to which the present invention pertains.

Technical Solution

In an aspect of the present disclosure, a method of decoding an image, the method comprising: decoding transformation information; creating at least one transformed reference picture by applying the transformation information to at least one reference picture organized in a reference picture list; inserting the at least one transformed reference picture into the reference picture list; and performing motion compensation by using the reference picture list.

The method further includes inserting of the at least one transformed reference picture comprises: determining whether to insert the transformed reference picture into the reference picture list on the basis of transformed reference picture utilization information; and inserting the at least one transformed reference picture into the reference picture list according to the determination result.

The transformed reference picture is positioned next to a last reference picture of the reference pictures organized in the reference picture list.

The creating of the at least one transformed reference picture is performed by applying the transformation information to at least one reference picture positioned at a predetermined position within the reference picture list.

The reference picture list includes an L0 reference picture list, an L1 reference picture list, or both, and in the performing of the motion compensation, the L0 reference picture list, the L1 reference picture list, or both are used.

The performing of the motion compensation is performed through weighted prediction in a case where the motion compensation is performed for bidirectional prediction in which both of the L0 reference picture list and the L1 reference picture list are used.

In another aspect of the present disclosure, a method of creating a transformed reference picture, the method comprising: extracting a feature point of a current picture and a feature point of a reference picture; deriving transformation information on the basis of the feature points; and creating the transformed reference picture using the transformation information.

The deriving of the transformation information comprises: calculating a geometric transformation relation based on the feature points; and deriving transformation information based on the geometric transformation relation.

The transformation information is expressed in a matrix form.

In another aspect of the present disclosure, a method of predicting a motion, the method comprising: setting a search area in a reference picture, a transformed reference picture, or both; searching the search area for the most similar pixel area to a current block; and producing a motion vector between the found pixel area and the current block.

The method further includes calculating a coding cost of the obtained motion vector; and updating least-cost search information on the basis of the calculated coding cost, wherein the least-cost search information includes information indicating a reference picture with which the coding cost is least or a transformed reference picture with which the coding cost is least.

In another aspect of the present disclosure, a method of encoding an image, the method comprising: setting a search area in each of a reference picture and a transformed reference picture; calculating a first coding cost for a case where the reference picture is used and a second coding cost for a case where the transformed reference picture is used; comparing the first coding cost and the second coding cost; and encoding transformed reference picture utilization information according to the comparison result.

According to another aspect of the present invention, there is provided a method of encoding an image, the method including: generating a transformed picture of a reference picture included in a first reference picture list; determining whether there is a duplicate reference picture identical to a reference picture existing in the first reference picture list among reference pictures in a second reference picture; and generating transformed pictures of the respective reference pictures in the second reference picture list, excluding the duplicate reference picture that is identified in the determining.

The encoding method may further include encoding transform information for the reference picture in the first reference picture list.

The encoding method may further include encoding transform information for the reference pictures except for the duplicate reference picture in the second reference picture list.

The encoding method may further include constructing a transformed reference picture list composed of the generated transformed pictures.

The encoding method may further include encoding transformed picture generation omission information indicating the reference pictures except for the duplicate reference picture in the second reference picture list on the basis of the result of the determining.

According to a further aspect of the invention, there is provided a method of decoding an image, the method including: generating a transformed picture of a reference picture in a first reference picture list; obtaining transformed picture generation omission information; identifying at least one reference picture with reference to the transformed picture generation omission information from among reference pictures in a second reference picture list; and generating transformed pictures of the respective reference pictures excluding the identified reference picture in the second reference picture list.

The decoding method may further include decoding transform information for at least one reference picture in the first reference picture list.

The decoding method may further include decoding transform information for the reference pictures excluding the identified reference picture in the second reference picture list.

The decoding method may further include constructing a transformed reference picture list composed of the generated transformed pictures.

According to a yet further aspect of the invention, there is provided a method of decoding an image, the method including: generating a transformed picture of a reference picture in a first reference picture list; determining whether all reference pictures in a second reference picture list are identical to the reference pictures in the first reference picture list; and generating a transformed picture of a reference picture in the second reference picture list only when the determining reveals a negative result.

According to a yet further aspect of the invention, there is provided a method of encoding an image, the method including: generating a transformed picture of a reference picture in a first reference picture list; determining whether all reference pictures in a second reference picture are identical to the reference pictures in the first reference picture list; and generating a transformed picture of a reference picture in the second reference picture list only when the determining reveals a negative result.

According to a yet further aspect of the invention, there is provided a computer-readable recording medium in which a bit stream generated by at least one of the methods and apparatuses according to the invention is stored.

Advantageous Effects

According to the present invention, it is possible to provide an image encoding/decoding method and apparatus capable of improving compression efficiency by using a transformed picture as a reference picture.

According to the present invention, it is possible to provide an image encoding/decoding method and apparatus capable of improving compression efficiency by reducing redundant operations during prediction of an image signal.

In addition, according to the present invention, it is possible to provide a recording medium in which a bitstream created by an image encoding method or apparatus according to the present invention is stored.

Effects that may be obtained from the present disclosure will not be limited to only the above described effects. In addition, other effects which are not described herein will become apparent to those skilled in the art from the following description.

DESCRIPTION OF THE PREFERRED EMBODIMENTS

Figure 1:
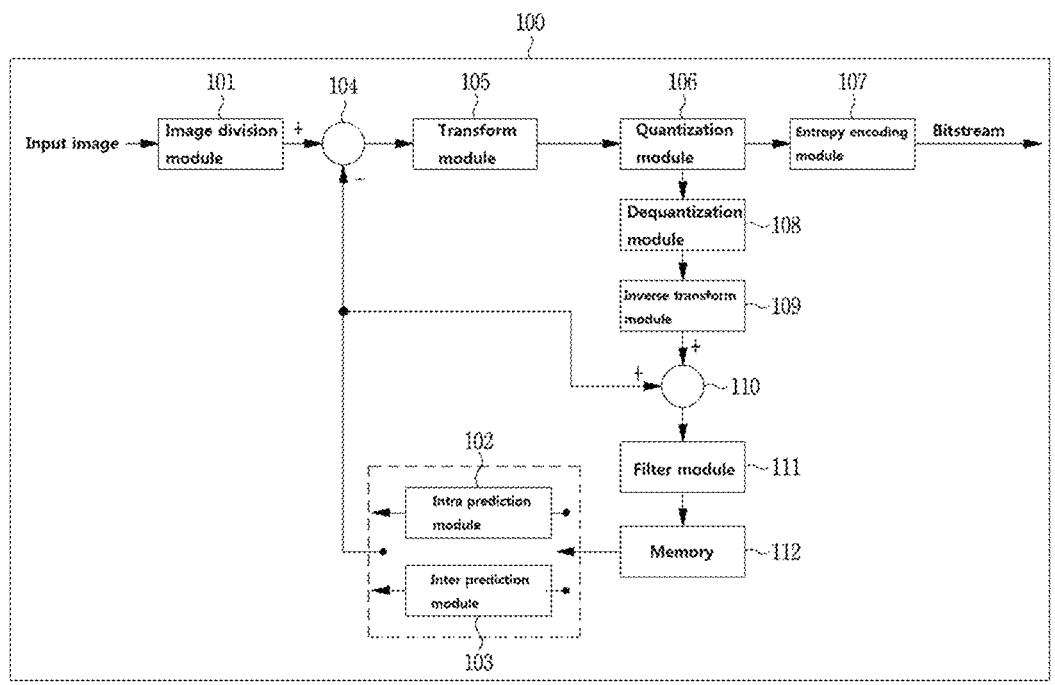
FIG. 1 is a block diagram illustrating an apparatus for encoding an image according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar elements described in the drawings.

Terms used in the specification, "first", "second", etc. can be used to describe various elements, but the elements are not to be construed as being limited to the terms. The terms are only used to differentiate one element from other elements. For example, the "first" element may be named the "second" element without departing from the scope of the present invention, and the "second" element may also be similarly named the "first" element. The term "and/or" includes a combination of a plurality of items or any one of a plurality of terms.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, embodiments of the present invention will be described in detail with reference to the accompanying drawings. Hereinafter, the same elements in the drawings are denoted by the same reference numerals, and a repeated description of the same elements will be omitted.

FIG. 1 is a block diagram illustrating an apparatus for encoding an image according to an embodiment of the present invention.

Referring to FIG. 1, an apparatus 100 for encoding an image may include an image division module 101, an intra prediction module 102, an inter prediction module 103, a subtractor 104, a transform module 105, a quantization module 106, an entropy encoding module 107, a dequantization module 108, an inverse transform module 109, an adder 110, a filter module 111, and a memory 112.

The constituents shown in FIG. 1 are independently shown so as to represent characteristic functions different from each other in the apparatus for encoding the image. Thus, it does not mean that each constituent is constituted in a constituent unit of separated hardware or software. In other words, each constituent includes each of enumerated constituents for convenience. Thus, at least two constituents of each constituent may be combined to form one constituent or one constituent may be divided into a plurality of constituents to perform each function. The embodiment where each constituent is combined and the embodiment where one constituent is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constituents for implementing the essence of the present invention except the constituents used in improving performance. The structure including only the indispensable constituents except the selective constituents used in improving only performance is also included in the scope of the present invention.

The image division module 100 may divide an input image into one or more blocks. Here, the input image may have various shapes and sizes, such as a picture, a slice, a tile, a segment, a tile group, and the like. A block may mean a coding unit (CU), a prediction unit (PU), or a transform unit (TU). The dividing may be performed on the basis of at least one among a quad tree, a binary tree, and a ternary tree. Quad tree division is a method of dividing the upper block into four lower blocks of which width and height are half of those of the upper block. Binary tree division is a method of dividing the upper block into two lower blocks of which either width or height is half of that of the upper block. Ternary tree division is a method of dividing the upper block into three lower blocks. For example, the three lower blocks may be obtained by dividing the width or the height of the upper block at a ratio of 1:2:1. Through binary tree-based division, a block may be in a square shape as well as a non-square shape. A block may be divided in the quad tree first. A block corresponding to a leaf node in the quad tree may not be divided, or may be divided in the binary tree or the ternary tree. The leaf node in the binary tree or the ternary tree may be a unit of encoding, prediction, and/or transform.

The prediction modules 102 and 103 may include an inter prediction module 103 performing inter prediction and an intra prediction module 102 performing intra prediction. Whether to perform inter prediction or intra prediction for the prediction unit may be determined, and detailed information (for example, an intra prediction mode, a motion vector, a reference picture, and the like) according to each prediction method may be determined. Here, the processing unit subjected to prediction may be different from the processing unit in which the prediction method and the detailed content are determined. For example, the prediction method, the prediction mode, and the like may be determined by the prediction unit, and prediction may be performed by the transform unit.

A residual value (residual block) between the generated prediction block and an original block may be input to the transform module 105. Also, prediction mode information used for prediction, motion vector information, and the like may be encoded with the residual value by the entropy encoding module 107 and may be transmitted to an apparatus for decoding. When a particular encoding mode is used, the original block is intactly encoded and transmitted to a decoding module without generating the prediction block by the prediction modules 102 and 103.

The intra prediction module 102 may generate a prediction block on the basis of reference pixel information around a current block, which is pixel information in the current picture. When the prediction mode of the nearby block of the current block on which intra prediction is to be performed is inter prediction, a reference pixel included in the nearby block to which inter prediction has been applied is replaced by a reference pixel within another nearby block to which intra prediction has been applied. That is, when a reference pixel is unavailable, at least one reference pixel of available reference pixels is used instead of unavailable reference pixel information. For intra prediction, multiple reference pixel lines may be available. When multiple reference pixel lines are available, information on which reference pixel line is referenced is signaled.

Prediction modes in intra prediction may include a directional prediction mode using reference pixel information depending on a prediction direction and a non-directional mode not using directional information in performing prediction. A mode for predicting luma information may be different from a mode for predicting chroma information, and in order to predict the chroma information, intra prediction mode information used to predict the luma information or predicted luma signal information may be utilized.

The intra prediction module 102 may include an adaptive intra smoothing (AIS) filter, a reference pixel interpolation module, and a DC filter. The AIS filter is a filter performing filtering on the reference pixel of the current block, and whether to apply the filter may be determined adaptively according to the prediction mode, the size, the shape of the current prediction unit, and/or whether the reference pixel is included in the reference pixel line immediately adjacent to the current block. When the prediction mode of the current block is a mode in which AIS filtering is not performed, the AIS filter is not applied.

When the prediction unit is in the intra prediction mode where intra prediction is performed on the basis of the pixel value obtained by interpolating the reference pixel, the reference pixel interpolation module of the intra prediction module 102 interpolates the reference pixel to generate the reference pixel at the fraction unit position. When the prediction mode of the current prediction unit is a prediction mode in which a prediction block is generated without interpolating the reference pixel, the reference pixel is not interpolated. The DC filter may generate a prediction block through filtering when the prediction mode of the current block is a DC mode.

With respect to the prediction block generated by intra prediction, additional filtering may be performed. The additional filtering may be performed on the basis of the intra prediction mode, the size, the shape of the block, and/or the position of the pixel within the prediction block.

The inter prediction module 103 generates a prediction block using a pre-reconstructed reference image stored in the memory 112 and motion information. Motion information may contain, for example, a motion vector, a reference picture index, a list 1 prediction flag, a list 0 prediction flag, and the like.

A residual block including residual value information that is a difference value between a prediction unit generated by the prediction modules 102 and 103 and the original block of the prediction unit. The generated residual block may be input to the transform module 130 for transform.

The inter prediction module 103 may derive a prediction block on the basis of information on at least one picture among the previous picture and the subsequent picture of the current picture. Further, the prediction block of the current block may be derived on the basis of information on a partial region with encoding completed within the current picture. According to the embodiment the inter prediction module 103 may include a reference picture interpolation module, a motion prediction module, and a motion compensation module.

The reference picture interpolation module may receive reference picture information from the memory 112 and may generate pixel information of an integer pixel or less from the reference picture. In the case of luma pixels, an 8-tap DCT-based interpolation filter having different coefficients may be used to generate pixel information on an integer pixel or less on a per-¼ pixel basis. In the case of chroma signals, a 4-tap DCT-based interpolation filter having different filter coefficients may be used to generate pixel information on an integer pixel or less on a per-⅛ pixel basis.

The motion prediction module may perform motion prediction based on the reference picture interpolated by the reference picture interpolation module. As methods for calculating a motion vector, various methods, such as a full search-based block matching algorithm (FBMA), a three step search (TSS) algorithm, a new three-step search (NTS) algorithm, and the like may be used. The motion vector may have a motion vector value on a per-½ or -¼ pixel basis on the basis of the interpolated pixel. The motion prediction module may predict a prediction block of a current block by changing the motion prediction method. As motion prediction methods, various methods, such as a skip method, a merge method, an advanced motion vector prediction (AMVP) method, and the like may be used.

The subtractor 104 generates the residual block of the current block by subtracting the block to be encoded now from the prediction block generated by the intra prediction module 102 or the inter prediction module 103.

The transform module 105 may transform the residual block containing residual data, by using transform methods, such as DCT, DST, Karhunen-Loeve transform (KLT), and the like. Here, the transform method may be determined on the basis of the prediction method (inter or intra prediction) of the prediction unit that is used to generate the residual block, the intra prediction mode, and the size and/or the shape of the transform unit. For example, depending on the intra prediction mode, DCT may be used in the horizontal direction, and DST may be used in the vertical direction. For example, when the size of the transform unit is in a predetermined range, DST is used in the direction corresponding to the short one among the width and the height of the transform unit, and DCT is used in the direction corresponding to the long one. For example, DST may be DST-7, and DCT may be DCT-2.

The quantization module 106 may quantize values transformed into a frequency domain by the transform module 105. Quantization coefficients may vary according to a block or importance of an image. The value calculated by the quantization module 106 may be provided to the dequantization module 108 and the entropy encoding module 107.

The transform module 105 and/or the quantization module 106 may be selectively included in the apparatus 100 for encoding an image. That is, the apparatus 100 for encoding an image may perform at least one between transform and quantization on residual data of the residual block, or may encode the residual block by skipping both transform and quantization. Even though the apparatus 100 for encoding an image does not perform either transform or quantization or does not perform both transform and quantization, the block that is input to the entropy encoding module 107 is generally referred to as a transform block. The entropy encoding module 107 entropy encodes the input data. Entropy encoding may use various encoding methods, for example, exponential Golomb coding, context-adaptive variable length coding (CAVLC), and context-adaptive binary arithmetic coding (CABAC).

The entropy encoding module 107 may encode a variety of information, such as coefficient information of a transform block, block type information, prediction mode information, division unit information, prediction unit information, transmission unit information, motion vector information, reference frame information, interpolation information of a block, filtering information, and the like. The coefficients of the transform block may be encoded on a per-sub-block basis within the transform block.

In order to encode a coefficient of a transform block, various syntax elements may be encoded in the reverse scan order, such as the first syntax element Last_sig that informs of the position of a non-zero coefficient, a flag Coded_sub_blk_flag that informs whether at least one non-zero coefficient is present within a sub-block, a flag Sig_coeff_flag that informs whether the coefficient is a non-zero coefficient, a flag Abs_greater1_flag that informs whether the absolute value of the coefficient is larger than one, a flag Abs_greater2_flag that informs whether the absolute value of the coefficient is larger than two, a flag Sign_flag indicating the sign of the coefficient, and the like. The remaining value of the coefficient that is not encoded only with the syntax elements may be encoded through a syntax element remaining_coeff.

The dequantization module 108 dequantizes the values quantized by the quantization module 106, and the inverse transform module 109 inversely transforms the values transformed by the transform module 105. The residual value generated by the dequantization module 108 and the inverse transform module 109 may be combined with the prediction unit predicted by a motion estimation module, a motion compensation module, and the intra prediction module 102 of the prediction modules 102 and 103 such that a reconstructed block may be generated. The adder 110 generates a reconstructed block by adding the prediction block generated by the prediction modules 102 and 103 and the residual block generated by the inverse transform module 109.

The filter module 111 may include at least one of a deblocking filter, an offset correction module, and an adaptive loop filter (ALF).

The deblocking filter may eliminate block distortion that occurs due to boundaries between the blocks in the reconstructed picture. In order to determine whether to perform deblocking, whether to apply the deblocking filter to the current block may be determined on the basis of the pixels included in several rows and columns in the block. When the deblocking filter is applied to the block, a strong filter or a weak filter is applied depending on required deblocking filtering intensity. Further, in applying the deblocking filter, when performing horizontal direction filtering and vertical direction filtering, horizontal direction filtering and vertical direction filtering are configured to be processed in parallel.

The offset correction module may correct an offset from the original image on a per-pixel basis with respect to the image subjected to deblocking. In order to perform offset correction on a particular picture, it is possible to use a method of separating pixels of the image into the predetermined number of regions, determining a region to be subjected to offset, and applying the offset to the determined region or a method of applying an offset considering edge information of each pixel.

Adaptive loop filtering (ALF) may be performed on the basis of the value obtained by comparing the filtered reconstruction image and the original image. The pixels included in the image may be divided into predetermined groups, a filter to be applied to each of the groups may be determined, and filtering may be individually performed on each group. Information on whether to apply ALF and a luma signal may be transmitted for each coding unit (CU), and the shape and the filter coefficient of the ALF filter to be applied may vary depending on each block. Further, the ALF filter in the same form (fixed form) may be applied regardless of the characteristic of the application target block.

The memory 112 may store the reconstructed block or picture calculated through the filter module 111, and the stored reconstructed block or picture may be provided to the prediction modules 102 and 103 when performing inter prediction.

Figure 2:
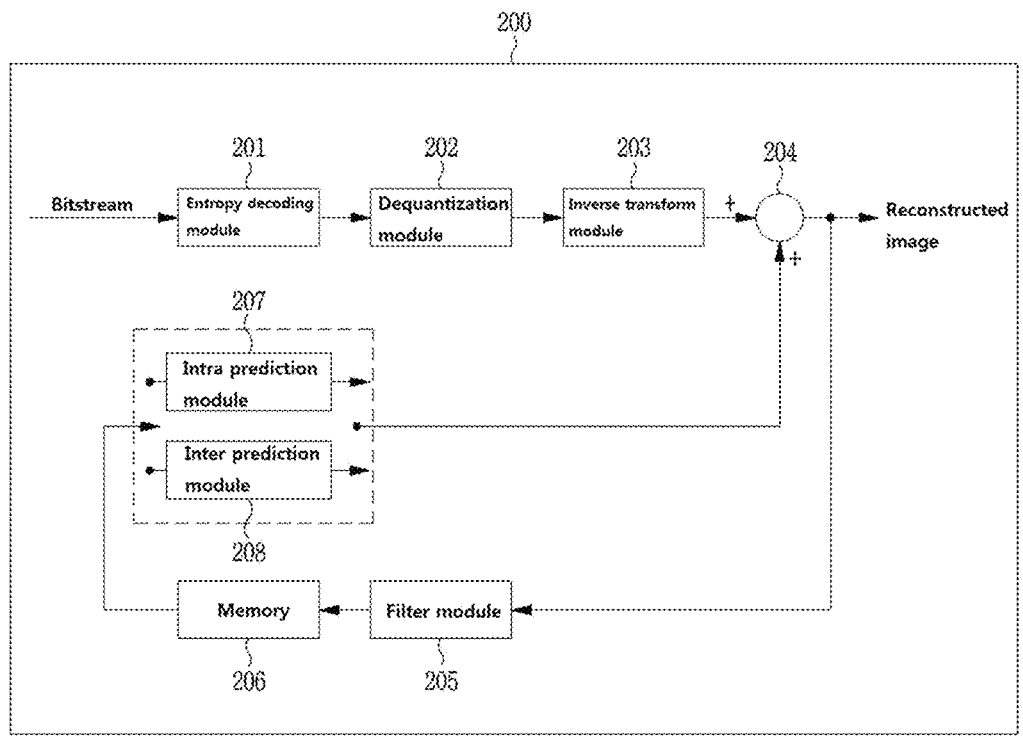
FIG. 2 is a block diagram illustrating an apparatus for decoding an image according to an embodiment of the present invention.

Next, an apparatus for decoding an image according to the present invention will be described with reference to the drawings. FIG. 2 is a block diagram illustrating an apparatus 200 for decoding an image according to an embodiment of the present invention.

Referring to FIG. 2, the apparatus 200 for decoding an image may include an entropy decoding module 201, a dequantization module 202, an inverse transform module 203, an adder 204, a filter module 205, a memory 206, and prediction modules 207 and 208.

When an image bitstream generated by the apparatus 100 for encoding an image is input to the apparatus 200 for decoding an image, the input bitstream is decoded according to a reverse process of the process performed in the apparatus 100 for encoding an image.

The entropy decoding module 201 may perform entropy decoding according to the reverse procedure of the entropy encoding performed by the entropy encoding module 107 of the apparatus 100 for encoding an image. For example, corresponding to the methods performed by the image encoder, various methods, such as exponential Golomb coding, context-adaptive variable length coding (CAVLC), and context-adaptive binary arithmetic coding (CABAC) may be applied. The entropy decoding module 201 may decode syntax elements, as described above, namely, Last_sig, Coded_sub_blk_flag, Sig_coeff_flag, Abs_greater1_flag, Abs_greater2_flag, Sign_flag, and remaining_coeff. Further, the entropy decoding module 201 may decode information on intra prediction and inter prediction performed by the apparatus 100 for encoding an image.

The dequantization module 202 may generate a transform block by performing dequantization on the quantized transform block. It operates substantially in the same manner as the dequantization module 108 in FIG. 1.

The inverse transform module 203 generates the residual block by performing inverse transform on the transform block. Here, the transform method may be determined on the basis of the prediction method (inter or intra prediction), information on the size and/or the shape of the block, the intra prediction mode, and the like. It operates substantially in the same manner as the inverse transform module 109 in FIG. 1.

The adder 204 generates a reconstructed block by adding the prediction block generated by the intra prediction module 207 or the inter prediction module 208 and the residual block generated by the inverse transform module 203. It operates substantially in the same manner as the adder 110 in FIG. 1.

The filter module 205 reduces various types of noises occurring in the reconstructed blocks.

The filter module 205 may include the deblocking filter, the offset correction module, and the ALF.

From the apparatus 100 for encoding the image, it is possible to receive information on whether the deblocking filter is applied to the block or picture and information on whether the strong filter or the weak filter is applied when the deblocking filter is applied. The deblocking filter of the apparatus 200 for decoding an image may receive information on the deblocking filter from the apparatus 100 for encoding an image, and the apparatus 200 for decoding an image may perform deblocking filtering on the block.

The offset correction module may perform offset correction on the reconstructed image on the basis of the type of offset correction, offset value information, and the like applied to the image in performing encoding.

The ALF may be applied to the coding unit on the basis of information on whether to apply the ALF, ALF coefficient information, and the like received from the apparatus 100 for encoding an image. The ALF information may be provided by being included in a particular parameter set. The filter module 205 operates substantially in the same manner as the filter module 111 in FIG. 1.

The memory 206 stores a reconstructed block generated by the adder 204. It operates substantially in the same manner as the memory 112 in FIG. 1.

The prediction modules 207 and 208 may generate a prediction block on the basis of information on prediction block generation received from the entropy decoding module 201 and information on a previously decoded block or picture received from the memory 206.

The prediction modules 207 and 208 may include an intra prediction module 207 and an inter prediction module 208. Although not shown, the prediction modules 207 and 208 may further include a prediction unit determination module. The prediction unit determination module may receive a variety of information, such as prediction unit information, prediction mode information of an intra prediction method, information on motion prediction of an inter prediction method, and the like from the entropy decoding module 201, may distinguish a prediction unit in a current coding unit, and may determine whether inter prediction or intra prediction is performed on the prediction unit. By using information required in inter prediction of the current prediction unit received from the apparatus 100 for encoding the image, the inter prediction module 208 may perform inter prediction on the current prediction unit on the basis of information on at least one among the previous picture and the subsequent picture of the current picture including the current prediction unit. Alternatively, inter prediction may be performed on the basis of information on some pre-reconstructed regions in the current picture including the current prediction unit.

In order to perform inter prediction, it may be determined which of a skip mode, a merge mode, and an AMVP mode is used for the motion prediction method of the prediction unit included in the coding unit, on the basis of the coding unit.

The intra prediction module 207 generates the prediction block using the pre-reconstructed pixels positioned near the block to be currently encoded. When multiple reference pixel lines are available, which reference pixel line is referenced is identified on the basis of the information provided from the apparatus 100 for encoding an image.

The intra prediction module 207 may include an adaptive intra smoothing (AIS) filter, a reference pixel interpolation module, and a DC filter. The AIS filter is a filter performing filtering on the reference pixel of the current block, and whether to apply the filter may be determined adaptively according to the prediction mode, the size, the shape of the current prediction unit, and/or whether the reference pixel is included in the reference pixel line adjacent to the current block. The prediction mode of the prediction unit received from the apparatus 100 for encoding the image and AIS filter information are used for performing AIS filtering on the reference pixel of the current block. When the prediction mode of the current block is a mode in which AIS filtering is not performed, the AIS filter is not applied.

When the prediction unit is in the prediction mode where intra prediction is performed on the basis of the pixel value obtained by interpolating the reference pixel, the reference pixel interpolation module of the intra prediction module 207 interpolates the reference pixel to generate the reference pixel at the fraction unit position. The generated reference pixel at the traction unit position may be used as a prediction pixel of a pixel within the current block. When the prediction mode of the current prediction unit is a prediction mode in which a prediction block is generated without interpolating the reference pixel, the reference pixel is not interpolated.

The DC filter may generate a prediction block through filtering when the prediction mode of the current block is a DC mode.

It is described above that additional filtering may be performed on the prediction block generated by intra prediction.

The intra prediction module 207 operates substantially in the same manner as the intra prediction module 102 in FIG. 1.

The inter prediction module 208 generates an inter prediction block using a reference picture stored in the memory 206, and motion information. The inter prediction module 208 operates substantially in the same manner as the inter prediction module 103 in FIG. 1.

Hereinafter, various embodiments of the present invention will be described in detail with reference to the drawings.

Figure 3:
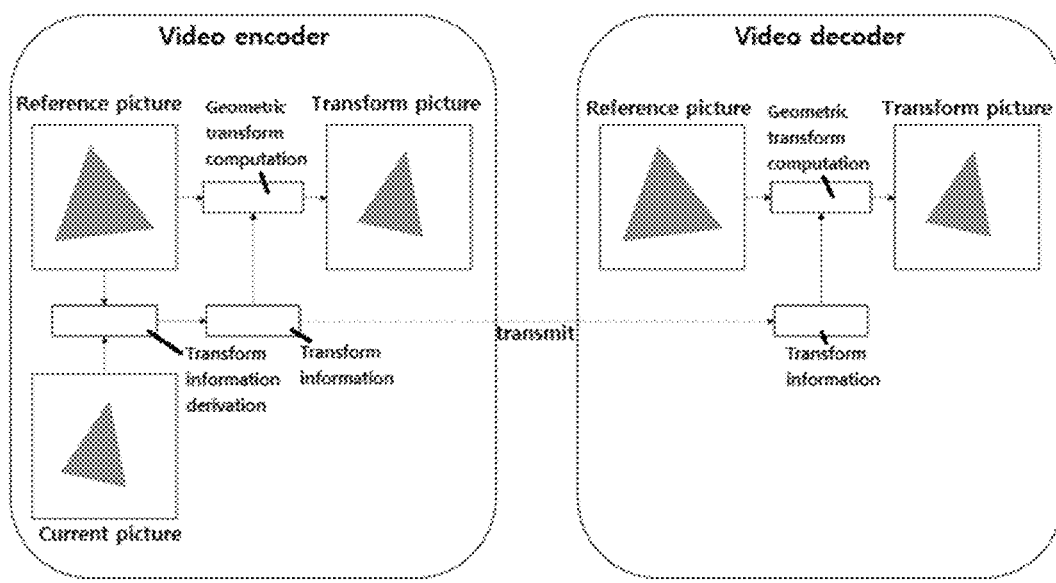
FIG. 3 is a diagram illustrating the concept of a video encoder and a video decoder that create a transformed picture to be used for inter prediction.

FIG. 3 is a diagram illustrating the concept of a video encoder and a video decoder that generate a transform picture to be used for inter prediction.

A video encoder retains raw data (information of the original) of a current picture as an input signal. Accordingly, transformation information is derived by calculating a geometric transformation relation between a reference picture and the original of a current picture. The video encoder creates a transformed picture by performing the geometric transformation calculation on a reference picture by using the derived transformation information. The created transformed picture can be used as reference information for inter prediction.

The video encoder transmits the derived transformation information to the video decoder. The video decoder creates a transformed picture by performing a geometric transformation calculation on a reference picture by using the transformation information received from the video encoder. Since video transformation information is the same as a reference picture, a transformed picture created by the video encoder is the same as a transformed picture created by the video decoder.

The video encoder and the video decoder perform motion prediction. When performing motion prediction, the video encoder and the video decoder predict information on a current region to be encoded or decoded by referring to information on the most similar region to the current region.

In this case, a reference region to be referred to for prediction is present within the same picture as the current region or a different picture (i.e., the reference picture). In the case of inter motion prediction, when the distance between a current image to be encoded or decoded and a reference image is too far, or when non-linear movements of an object, such as rotation, zoom-in, zoom-out, and perspective change of an object occur in combination, since the similarity between pixels is low. Thus, in this case, the compression efficiency of the motion prediction is greatly deteriorated.

A motion vector (MV), which is prediction information used in inter prediction according to the HEVC/H.265 standard, is information representing a two-dimensional parallel translation, that is, a linear motion. Therefore, the motion vector indicates the displacement between a current block and a prediction region.

Since a motion vector is linear information, it is not suitable to accurately represent non-linear motions such as rotation.

Therefore, when non-linear global motion such as rotation occurs in an image, the prediction accuracy of a non-linear motion is deteriorated due to errors in the case where the non-linear global motion is predicted with a single motion vector.

In this case, according to a conventional video codec such as HEVC, a prediction region in which a non-linear motion occurs is segmented into a plurality of smaller sub-regions and inter prediction is performed for each sub-region to minimize a prediction error.

In the case where inter prediction is performed after segmenting a prediction region into smaller sub-regions, the motion vectors are derived from respective blocks for which the inter prediction is performed. Therefore, the number of pieces of inter prediction information including motion vectors and block segmentation information transmitted from the encoder to the decoder increases.

Therefore, for an image in which a non-linear global motion occurs, the block segmentation is refined over the entire region of the image. Therefore, in this case, the number of pieces of prediction information increases greatly, and the prediction accuracy decreases. As a result, the compression efficiency is be greatly decreased.

Figure 4:
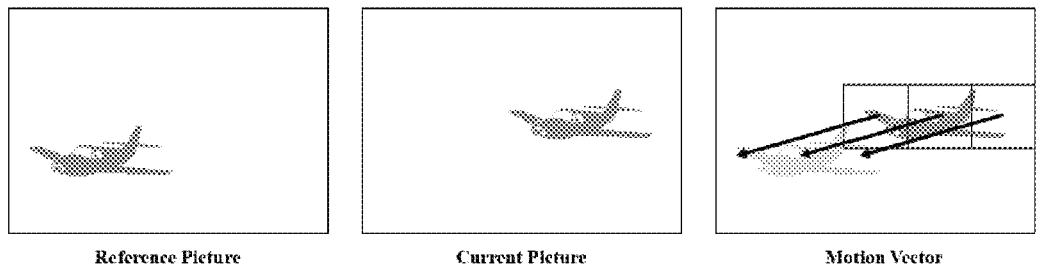
FIGS. 4A and 4B are diagrams illustrating an example of derivation of a motion vector and segmentation of a block during inter prediction for an image in which a linear motion occurs and for an image in which a non-linear motion occurs.
Figure 4:
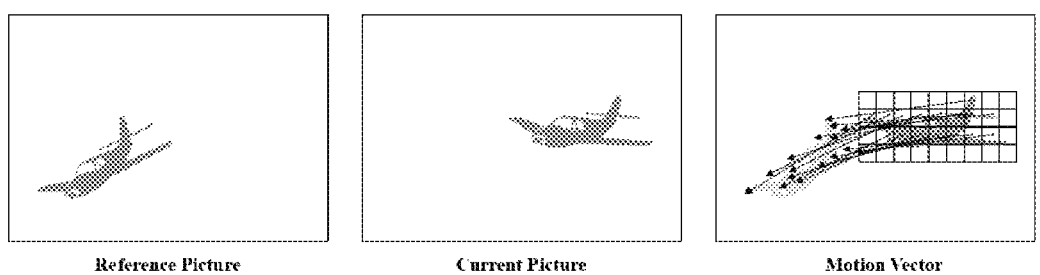

FIGS. 4A and 4B are diagrams illustrating an example of derivation of a motion vector and segmentation of a block during inter prediction for an image in which a linear motion occurs and for an image in which a non-linear motion occurs.

FIG. 4A illustrates a case where a linear motion occurs in an image, and FIG. 4B illustrates a case where a non-linear motion occurs in an image. In the inter prediction for a region in which a linear motion of an object occurs, a linear motion vector is derived (see FIG. 4A). However, in the inter prediction for a region in which a non-linear motion occurs, a current prediction region is segmented into smaller sub-regions and motion vectors of the respective sub-regions are derived (see FIG. 4B). Therefore, when a non-linear global motion occurs in an image due to camera rotation, zoom-in, or zoom-out, the motion of the same object in the image can be represented by several different motion vectors. Therefore, in this case, if a conventional prediction method such as HEVC is used, a lot of redundant information occurs, resulting in degradation in prediction performance.

Figure 5:
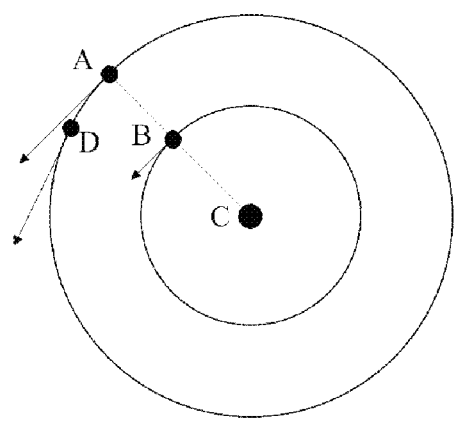
FIGS. 5A and 5B are diagrams illustrating an example of motion information per region within an image in which a non-linear motion occurs.
Figure 5:
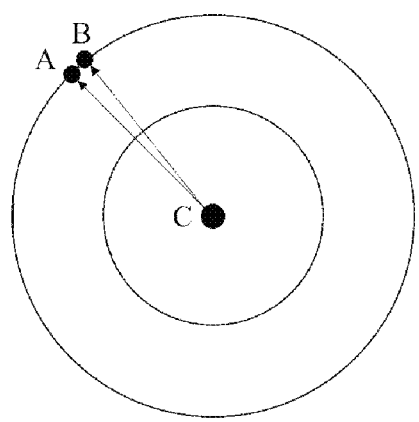

FIGS. 5A and 5B are diagrams illustrating an example of motion information per region in an image in which a non-linear motion occurs.

When there is an object rotating around a point C as illustrated in FIG. 5A, a region A moves a longer distance than a region B which is relatively close to the center of rotation for a certain period of time.

Accordingly, when a motion vector is derived on a per block basis to encode an image in which rotation of an object occurs, since the motion size varies according to the distance from the center of rotation to each point, different motions can be identified from the blocks adjacent to each other.

Also, when a motion vector is derived on a per block basis to encode an image in which rotation of an object occurs, different motion vectors can be derived from the blocks adjacent to each other because directions of motions can differ in each block of an image.

In FIG. 5A, since regions A and D move in the tangential directions on a rotation path which is a circular path, although the two regions A and D belong to adjacent blocks, respectively, the directions of motions of the regions A and D differ. Therefore, different motion vectors are derived from the regions A and B, respectively.

When a screen enlargement occurs with respect to a point C as illustrated in FIG. 5B, there is a high possibility that different motion information is derived from regions A and B, respectively. This is also true for a case where a zoom-out occurs.

Therefore, in the case where a non-linear global motion such as rotation, zoom-in, or zoom-out occurs, if inter prediction according to an existing codec is performed, there is a high likelihood that different motion vectors are derived from respective neighboring regions. Therefore, a chance of using the motion vector of a neighboring block for prediction of a current block is significantly reduced.

In this case, since the size difference between motion vectors is reduced as the distance between the points from which motion occurs is decreased, the conventional codec uses a method of deriving motion vectors by segmenting a block as small as possible when a nonlinear motion occurs. In this case, the number of pieces of information increases due to the block segmentations, resulting in a decrease in coding efficiency.

Therefore, the video encoder creates a transform picture (hereinafter referred to as a "transformed picture" for convenience of description) composed of similar regions (for example, frames, slices, tile groups, or block units) to the regions within a "picture to be coded or decoded" (hereinafter, referred to as a "current picture") by reflecting a motion change between the current picture and a reference picture, thereby improving prediction accuracy through motion prediction which is performed by using the transformed picture as reference information. When the video encoder has performed encoding by referring to a transformed picture, the video decoder performs decoding by receiving "information necessary for transformation" (hereinafter, referred to as "transformation information" for convenience of description) from the video encoder, creates a transformed picture, and uses the transformed picture as reference information for motion compensation. In the following description, a transformed picture used as reference information is referred to as a "transformed reference picture".

Figure 6:
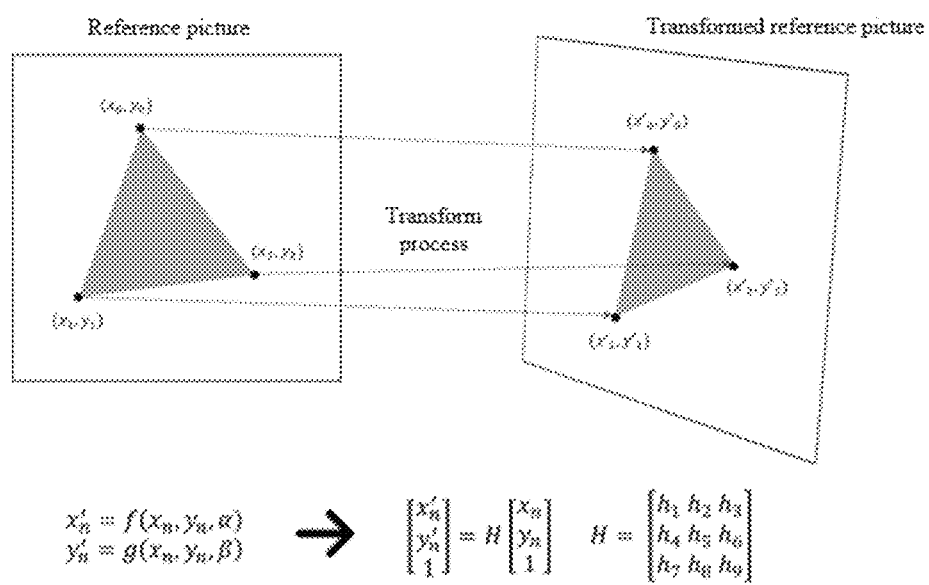
FIG. 6 is a diagram illustrating a geometric transformation process according to one embodiment of the present invention.

FIG. 6 is a diagram illustrating a geometric transformation process according to one embodiment of the present invention. FIG. 6 illustrates a transformation process of creating a transformed reference picture from a reference picture.

Referring to FIG. 6, (x0, y0), (x1, y1), and (x2, y2) denote arbitrary points within a reference picture, (X'0, y'0), (X'1, y'1), and (x'2, y'2) denote the corresponding points within a transformed reference picture.

In addition, f( ) is a function for calculating the corresponding x coordinate x' within a transformed reference picture by using an arbitrary point (x, y) within a reference picture and additional information α necessary for geometric transformation, and g( ) is a function for calculating the corresponding y coordinate y' within the transferred reference picture by using the arbitrary point (x, y) within the reference picture and additional information β necessary for the geometric transformation. The relation between the points (x, y) and (x', y') can be expressed as a matrix equation H on the basis of the functions f( ) and g( ).

The encoder and the decoder perform a transformation process based on the matrix equation H, thereby creating a transformed reference picture.

In order to derive transformation information, a pair of positions that respectively belong to a reference picture and a current picture are first identified, and then the geometric transformation relation therebetween is expressed in a matrix form.

As a model for representing a geometric transformation relation as a matrix form, a homography model is used which reflects geometric motions such as rotation, translation (parallel movement), enlargement, reduction, projection, and the like. Herein, a matrix created based on the homography model is defined as transformation information.

Figure 7:
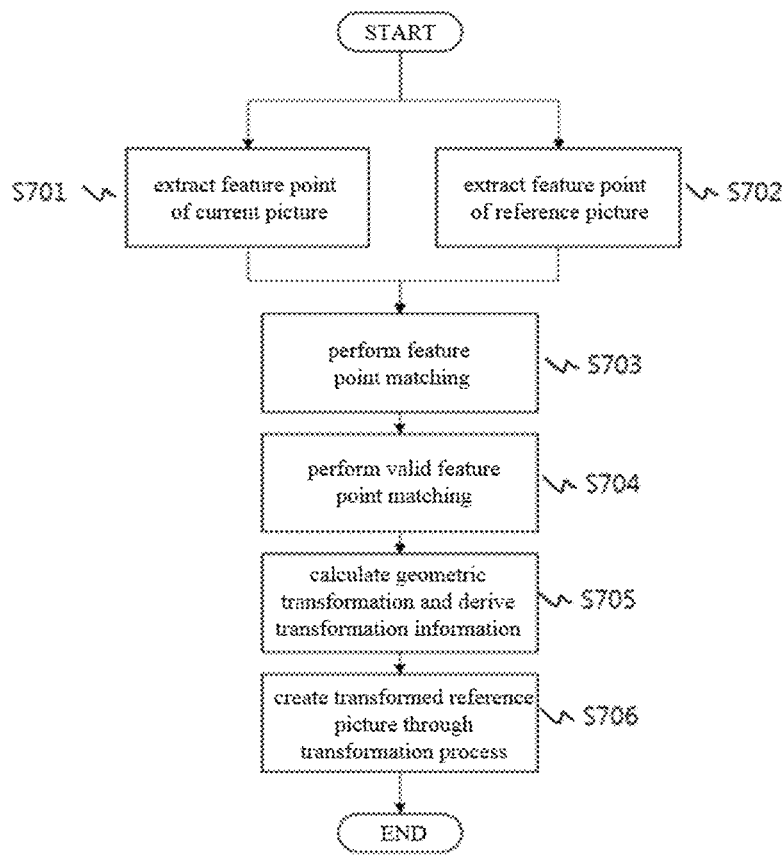
FIG. 7 is a flowchart illustrating a process of creating a transformed reference picture according to one embodiment of the present invention.

FIG. 7 is a flowchart illustrating a process of creating a transformed reference picture according to one embodiment of the present invention. FIG. 7 illustrates a process of deriving transformation information and creating a transformed reference picture in the encoder.

First, the encoder extracts the feature point of a current picture and extracts the feature point of a reference picture (S701 and S702). Two correspondence points disposed within respective pictures and used to find a mutual geometric transformation relation between a current picture and a reference picture are defined as "feature points".

Specifically, in order to derive two correspondence points in two pictures, distinguishable feature points are located by changing the brightness of the pictures.

Next, the encoder performs feature point matching (S703). However, there is a possibility that the identified two points are mismatched points that do not conform to a geometric transformation relation due to an error occurring in the feature point matching. Accordingly, valid feature points that do not deviate from the geometric transformation relation among the derived feature points are obtained for effective feature point matching (S704).

The encoder calculates a relation expression between two feature points within respective images through the valid feature point matching and derives transformation information by using the relation expression (S705).

Next, the encoder creates a transformed reference picture by performing transformation based on the derived transformation information (S706).

Figure 8:
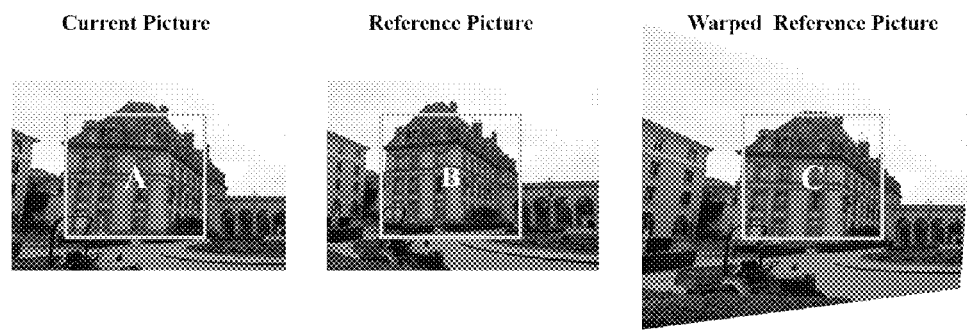
FIG. 8 is a diagram illustrating a comparison in pixel similarity among a current picture, a reference picture, and a transformed reference picture.

FIG. 8 is a diagram illustrating pixel similarities among a current picture, a reference picture, and a transform reference picture.

As illustrated in FIG. 8, the transformed reference picture created by the encoder/decoder has a pixel distribution more similar to that of the current picture than the reference picture. In FIG. 8, the transformed reference picture is a picture created by transforming the reference picture. As compared with the visual similarity between a region A within the current picture and a region B within the reference picture, the visual similarity between the region A within the current picture and a region C within the transformed reference picture is higher.

In the present disclosure, motion prediction and motion compensation based on a transformed reference picture on which global motion information is partially or entirely reflected will be described in detail. In the inter prediction for video coding, the motion prediction and motion compensation are performed on a per frame basis, on a per slice basis, on a per tile group basis, or on a per block basis.

Figure 9:
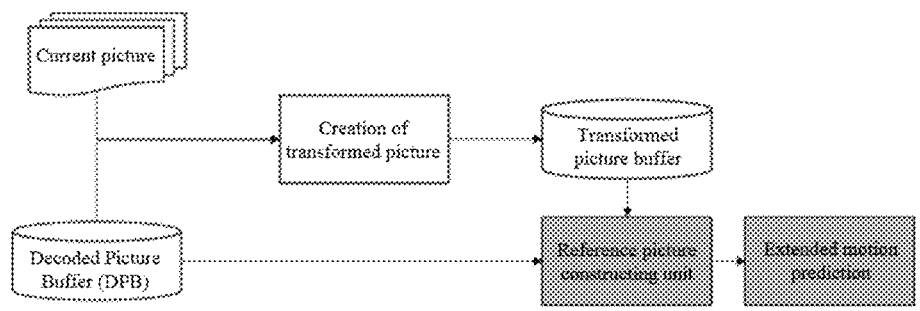
FIG. 9 is a diagram illustrating an example of an extended motion prediction process performed in an encoder according to one embodiment of the present invention.

FIG. 9 is a diagram illustrating an example of an extended motion prediction process performed in an encoder according to one embodiment of the present invention.

The encoder according to one embodiment of the present invention derives transformation information from a current picture and a reference picture in a decoded picture buffer and creates a transformed picture based on the derived transformation information. Next, the encoder stores the created transformed picture in a transformed picture buffer. The encoder according to the present invention includes: a reference picture constructing unit for preparing a transformed reference picture by fetching a transformed picture from a transformed picture buffer and for preparing reference information used for motion prediction by using a reference picture and the transformed reference picture; and an extended motion predicting unit for deriving optimal motion information by referring to both of the reference picture and the transformed reference picture for motion prediction.

The encoder according to the present invention derives optimal prediction information by using the reference picture and the transformed reference picture for motion prediction and signals the optimal prediction information to the decoder.

Figure 10:
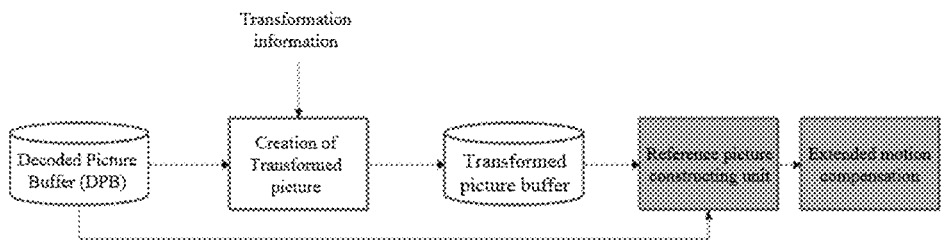
FIG. 10 is a diagram illustrating an extended motion compensation process performed in a decoder according to an embodiment of the present invention.

FIG. 10 is a diagram illustrating an extended motion compensation process performed in a decoder according to one embodiment of the present invention.

The decoder according to one embodiment of the present invention receives the transformation information from the encoder and creates a transformed picture from a reference picture extracted from the decoded picture buffer by performing a transformation process based on the transformation information. Next, the decoder stores the created transformed picture in the transformed picture buffer. The decoder according to the present invention includes: a reference picture constructing unit for preparing a reference picture to be used for motion compensation by fetching a reconstructed picture from the decoded picture buffer and a transformed picture from the transformed picture buffer on the basis of the optimal prediction signaled by the encoder; and an extended motion compensating unit for performing motion compensation using the constructed reference picture.

The reference picture constructing unit of the decoder according to the present invention constructs a reference picture from a reconstructed picture extracted from the reconstructed picture buffer, constructs a transformed reference picture from a transformed picture extracted from the transformed picture buffer, and use both the reference picture and the transformed reference picture as reference information for motion compensation. The extended motion compensating unit performs image reconstruction by using the reference picture and the transformed reference picture on the basis of the optimal prediction information signaled by the encoder.

Figure 11:
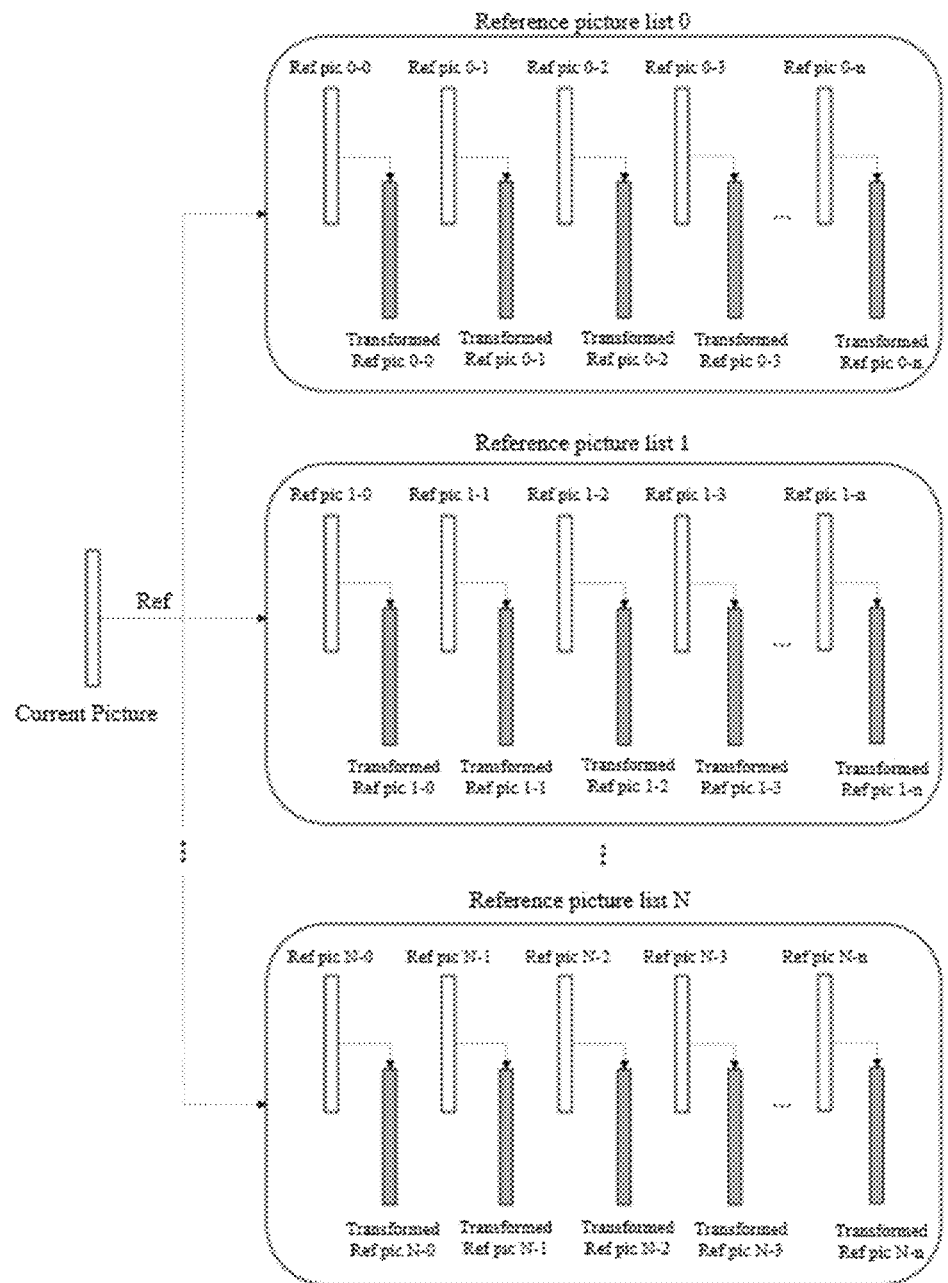
FIG. 11 is a diagram illustrating the construction of a reference picture according to one embodiment of the present invention.

FIG. 11 is a diagram illustrating the composition of reference pictures according to one embodiment of the present invention. A reference picture list illustrated in FIG. 11 is created by the reference picture constructing unit illustrated in FIGS. 9 and 10.

Referring to FIG. 11, the encoder and decoder according to the invention create transformed pictures from n reference pictures listed in N reference picture lists by calculating a geometric transformation relation with respect to the current picture. Here, each of n and M is a positive integer of 2 or greater. The reference picture constructing units illustrated in FIGS. 9 and 10 prepare transformed reference pictures by using the created transformed pictures so that both of the transformed reference pictures and the reference pictures are used as reference information for motion prediction.

FIG. 11 illustrates a case where all the reference pictures in all the reference picture lists are used to form a transformed reference picture. However, the invention is not limited thereto. That is, it is possible to create a transformed reference picture by performing the transformation process on some selected reference picture lists or some selected reference pictures.

Here, some selected reference picture lists used for creation of a transformed reference picture may be reference picture lists disposed at predetermined positions. For example, a transformed reference picture may be created by performing a transformation process on only an L0 reference picture list.

Alternatively, some selected reference picture lists used for creation of a transformed picture may be determined by the encoder, and selection information indicating a method of selecting the reference picture lists to be used may be signaled to the decoder.

On the other hand, a transformed reference picture can be created by performing a transformation process only on some reference pictures within a reference picture list.

Here, some reference pictures used for creation of a transformed reference picture may be reference pictures disposed at predetermined positions within the reference picture list. For example, a transformed reference picture is created by performing a transformation process only on a 0-th reference picture within the reference picture list.

Alternatively, some reference pictures to be used for creation of a transformed picture may be determined by the encoder, and selection information regarding this may be signaled to the decoder.

The above selection information is expressed in the form of a flag or index.

Figure 12:
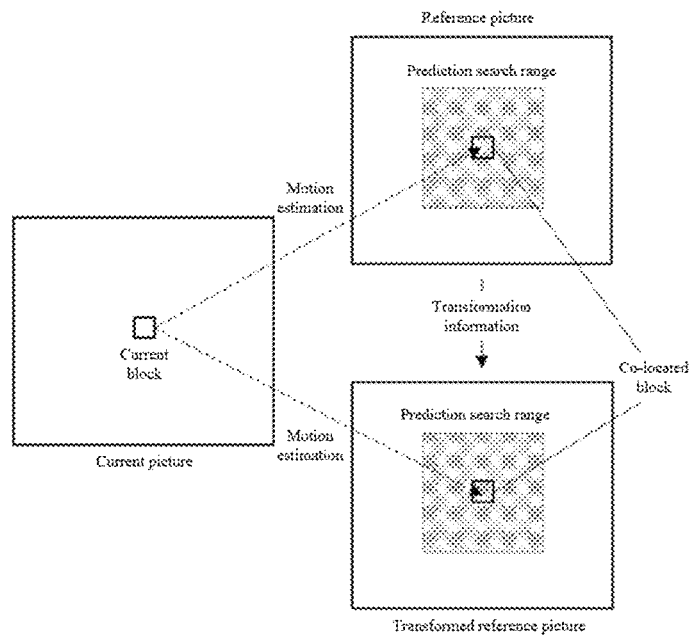
FIG. 12 is a diagram illustrating a motion prediction process according to one embodiment of the present invention.

FIG. 12 is a diagram illustrating a motion prediction method according to one embodiment of the present invention.

Referring to FIG. 12, optimal motion information is derived by using both of the reference picture of a current picture and the transformed reference picture that is created from the reference picture of the current picture according to the transformation information.

Figure 13:
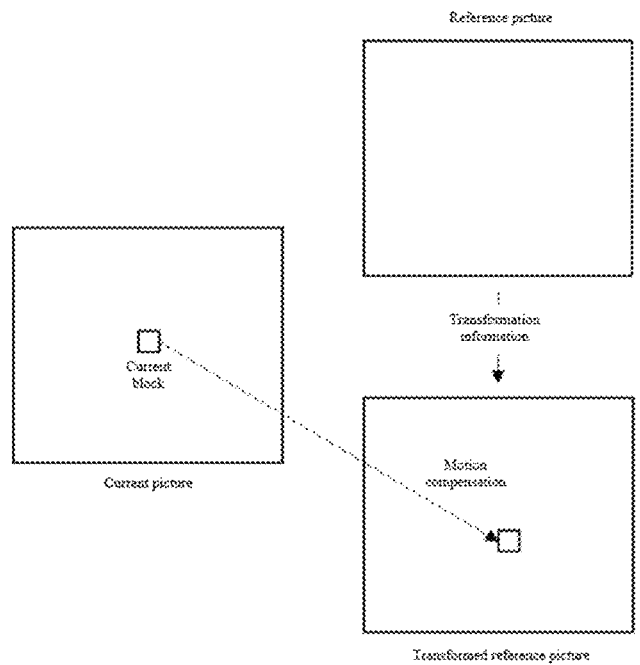
FIG. 13 is a diagram illustrating a motion compensation process according to one embodiment of the present invention.

FIG. 13 is a diagram illustrating a motion compensation method according to one embodiment of the present invention. Referring to FIG. 13, motion compensation is performed by referring to a transformed reference picture that is created by processing a reference picture according to the transformation information.

Figure 14:
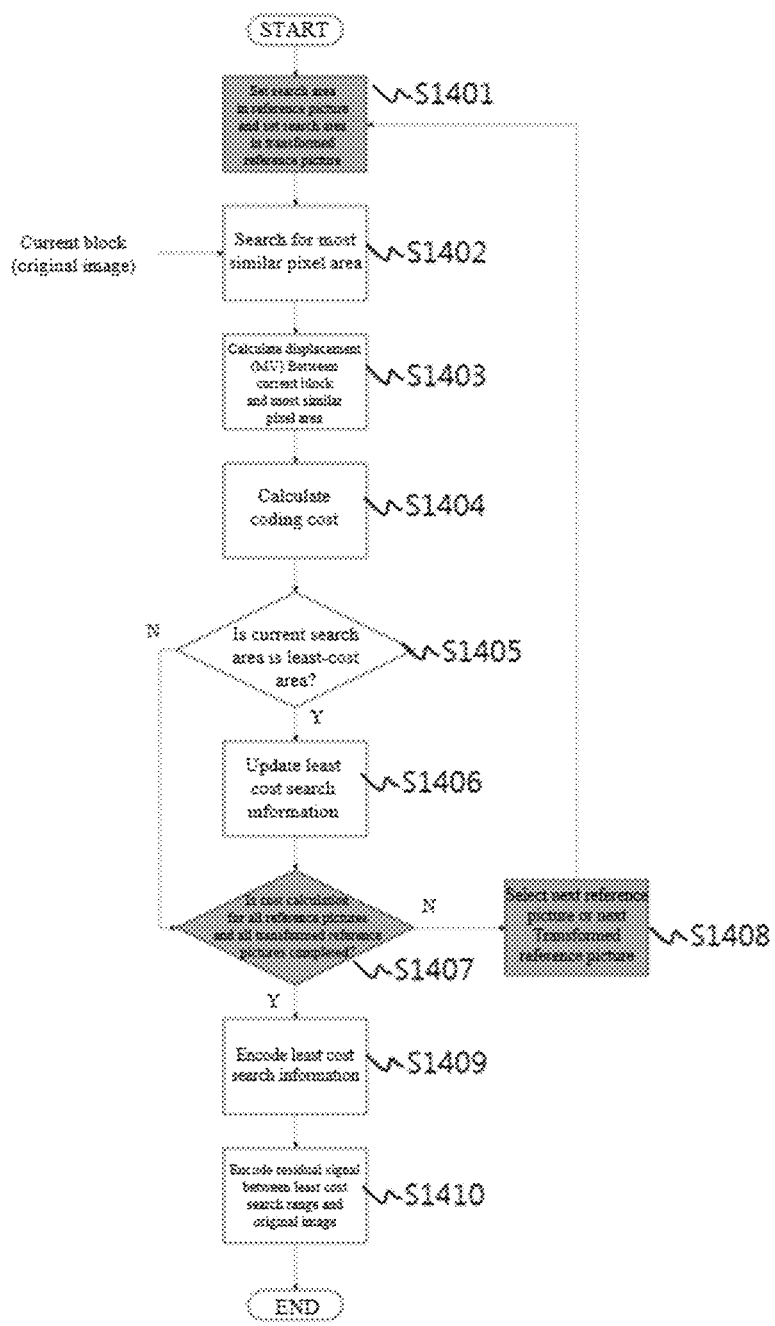
FIG. 14 is a flowchart illustrating a motion prediction process according to one embodiment of the present invention.

FIG. 14 is a flowchart illustrating a motion prediction process according to one embodiment of the present invention.

Referring to FIG. 14, the encoder sets a search area within a reference picture or a transformed reference picture (S1401).

Next, the encoder searches for a pixel area closest to a current block (S1402).

Next, the encoder calculates a displacement (or motion vector) between the current block and the most similar pixel area found in step S1402.

Next, the encoder calculates a coding cost for the calculated motion vector (S1404).

Next, the encoder determines whether a current search area incurs the least cost. When it is determined that the least cost is incurred by the current search area (Yes in S1405), least cost search information is updated (S1406). When it is not determined that the least cost is incurred by the current search area (No in S1405), the process proceeds to the next step (S1407) without updating the least cost search information.

Next, the encoder determines whether the coding cost calculation is iterated for all of the reference pictures and all of the transformed reference pictures. When it is not determined that the cording cost calculation is completed for all of the reference pictures or all of the transformed reference pictures (No in S1407), the next reference picture or the next transformed reference picture is selected and step S1401 is performed (S1408). When it is determined that the coding cost calculation is completed for all the reference pictures and all the transformed reference pictures (Yes in S1407), the least cost search information is encoded (S1409). Here, the least cost search information includes at least either a motion vector or information indicating a reference picture incurring the least cost (hereinafter, referred to as a least cost reference picture) or a transformed reference picture incurring the least cost (hereinafter, referred to as a least cost transformed reference picture).

Next, the encoder encodes a difference signal (residual signal) between the least cost search area and the original image (S1410).

According to the present invention, the motion prediction is performed by combining a process of searching for an optimal area from among areas within a transformed reference picture with a process of searching for an optimal area from among areas within a reference picture, which is used in the process of performing motion prediction to derive a motion vector in the existing encoders. Therefore, according to the present invention, the motion prediction areas for derivation of the motion vectors are extended to the transformed reference picture as well as the reference picture is used.

Figure 15:
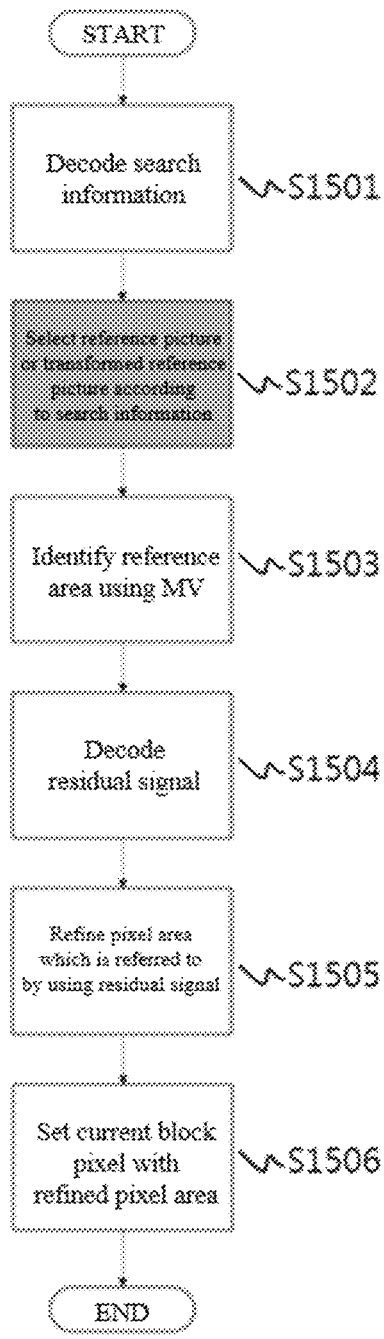
FIG. 15 is a flowchart illustrating a motion compensation process according to one embodiment of the present invention.

FIG. 15 is a flowchart illustrating a motion compensation process according to one embodiment of the present invention.

Referring to FIG. 15, the decoder decodes search information (S1501). Here, the search information is motion information. That is, the search information includes a motion vector, a reference picture index, or both.

Next, the decoder selects a reference picture or a transformed reference picture according to the search information (S1502). Specifically, the decoder uses a reference picture index of various kinds of the search information to select a reference picture or a transformed reference picture.

Next, the decoder identifies a reference area by using a motion vector (S1503). Here, the identified reference area may be a prediction signal.

Next, the decoder decodes a residual signal (difference signal) (S1504).

Next, the decoder refines a pixel area which is referred to by using the residual signal (S1505). Specifically, the decoder adds the residual signal to the pixel area (i.e., prediction signal) that is referred to.

Next, the decoder sets a current block pixel by using the refined pixel area (S1506). Here, the refined pixel area means a reconstructed signal.

On the other hand, the motion compensation method illustrated in FIG. 15 is similarly performed in the encoder.

Figure 16:
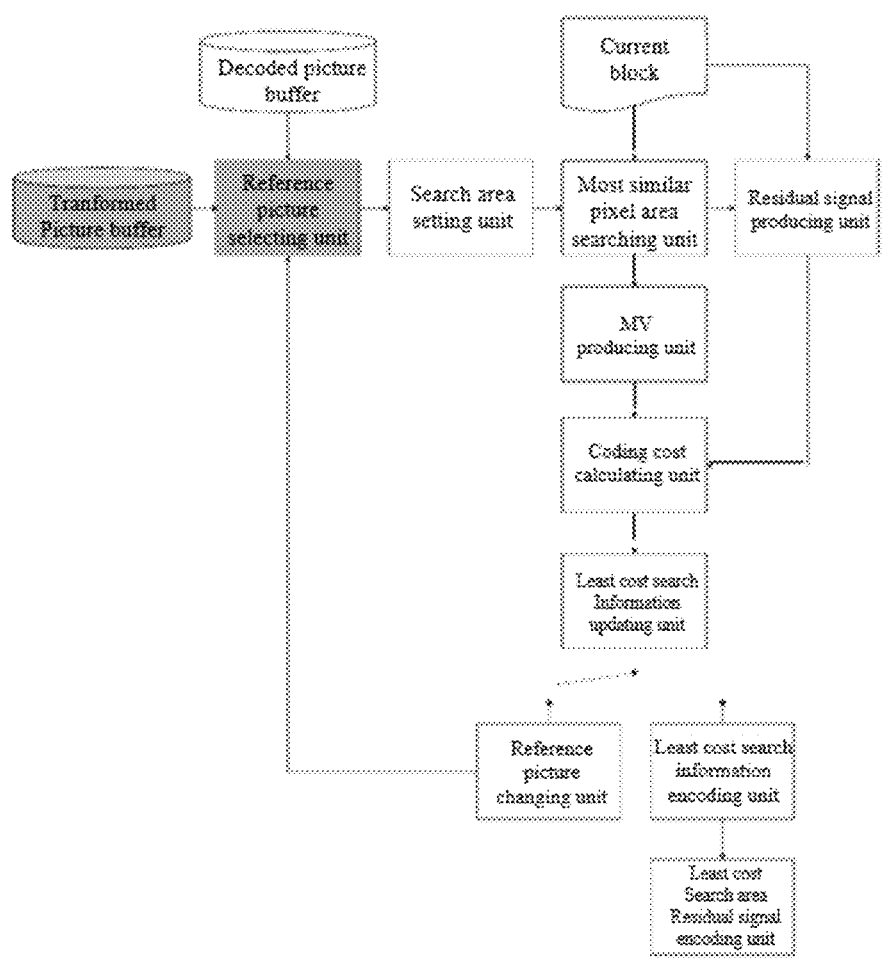
FIG. 16 is a diagram illustrating the construction of a motion prediction device of an encoder according to one embodiment of the present invention.

FIG. 16 is a diagram illustrating a motion prediction device of an encoder according to one embodiment of the present invention.

Referring to FIG. 16, the motion prediction device includes a transformed picture buffer, a decoded picture buffer, a reference picture buffer, a search area setting unit, a most similar pixel area searching unit, a residual signal producing unit, a motion vector (MV) producing unit, a coding cost calculating unit, a least cost search information updating unit, a reference picture changing unit, a least cost search information encoding unit, and a least cost search area correspondence residual signal encoding unit.

Here, a reference picture selecting unit uses at least one of a transformed picture stored in the transformed picture buffer and a reconstructed picture stored in the decoded picture buffer as a reference picture for motion prediction.

In FIG. 16, the transformed picture buffer and the decoded picture buffer are illustrated as separate buffers. However, a single buffer that can store both the transformed pictures and the reconstructed pictures can be used instead of the separate two buffers.

Figure 17:
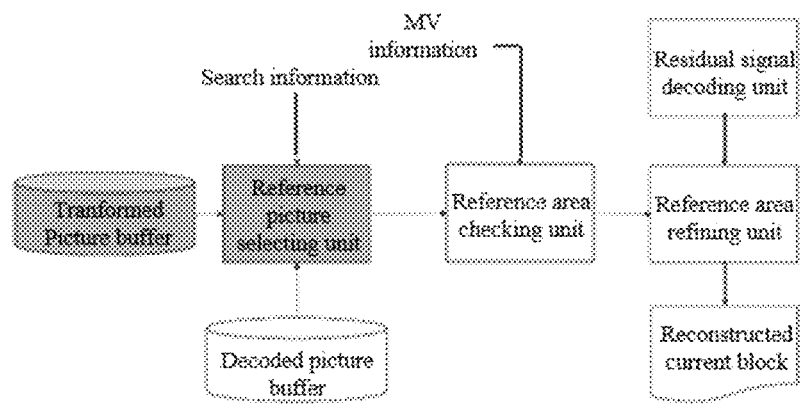
FIG. 17 is a diagram illustrating the construction of a motion compensation device of a decoder according to one embodiment of the present invention.

FIG. 17 is a diagram illustrating a motion compensation device of a decoder according to one embodiment of the present invention.

Referring to FIG. 17, the motion compensation device includes a transformed picture buffer, a decoded picture buffer, a reference picture selecting unit, a reference area checking unit, a residual signal decoding unit, and a reference area refining unit.

Here, the reference picture selecting unit uses at least one of a transformed picture stored in the transformed picture buffer and a reconstructed picture stored in the decoded picture buffer as a reference picture for motion compensation.

In FIG. 17, the transformed picture buffer and the decoded picture buffer are illustrated as separate buffers. However, a single buffer that can store both the transformed pictures and the reconstructed pictures may be used instead of the separate two buffers.

In addition, the motion compensation device illustrated in FIG. 17 may be mounted in the encoder.

Figure 18:
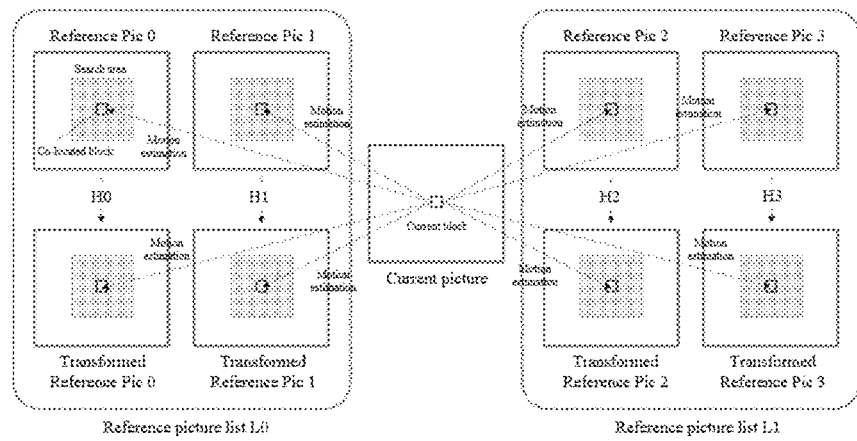
FIG. 18 is a diagram illustrating a motion prediction process performed in an encoder according to one embodiment of the present invention.

FIG. 18 is a diagram illustrating a motion prediction process performed in an encoder according to one embodiment of the present invention.

Referring to FIG. 18, the encoder uses two reference picture lists and two reference pictures to perform a motion prediction.

First, the encoder applies transformation information (H0, H1, H2, and H3 of FIG. 18) that is produced by calculating the geometric transformation relation between the current picture and each of the reference pictures organized in a reference picture list L0 and a reference picture list L1, thereby creating transformed pictures from the respective reference pictures.

In addition, the encoder defines the created transformed picture as transformed reference pictures and use them for motion prediction. As illustrated in FIG. 18, the proposed motion prediction method performed in the encoder derives the optimal motion information by performing motion prediction on all of the reference pictures contained the reference picture lists L0 and L1 and all of the transformed reference pictures constructed from the respective reference pictures. In this case, the motion prediction can perform unidirectionally or bidirectionally. The proposed method is not limited to the case illustrated FIG. 20. That is, the proposed method can apply to any case where N reference picture lists and n reference pictures are used.

FIGS. 19 to 22 are diagrams illustrating motion compensation methods according to various embodiments of the present invention. In FIGS. 19 to 22, it is assumed that there are reference picture lists L0 and L1 and each of the reference lists L0 and L1 contains two reference pictures and two transformed reference pictures that are created from the respective two reference pictures.

Figure 19:
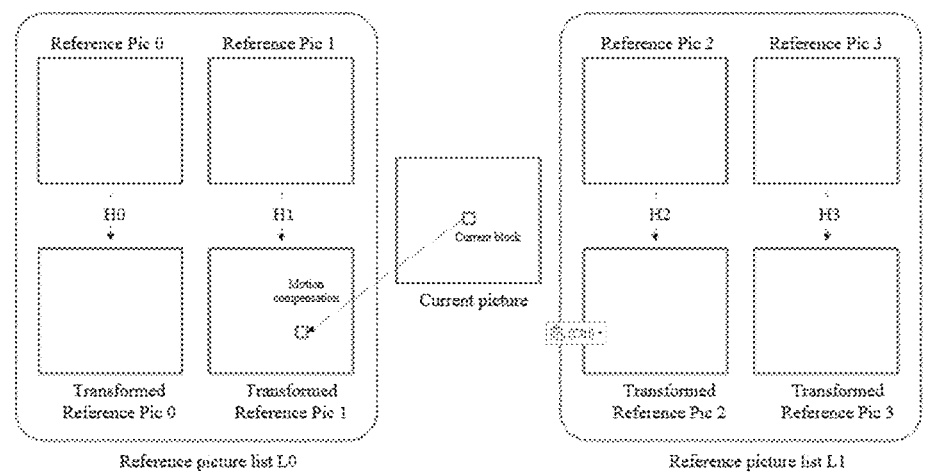
FIGS. 19 to 22 are diagrams illustrating motion compensation methods according to various embodiments of the present invention.

FIG. 19 illustrates an example of motion compensation for unidirectional prediction. Referring to FIG. 19, the encoder/decoder performs motion compensation by selecting a transformed reference picture 1 from among the reference pictures contained in the reference picture list L0. Here, the transformed reference picture 1 is a transformed reference picture created by applying a transformation matrix equation H1 to the reference picture 1.

Figure 20:
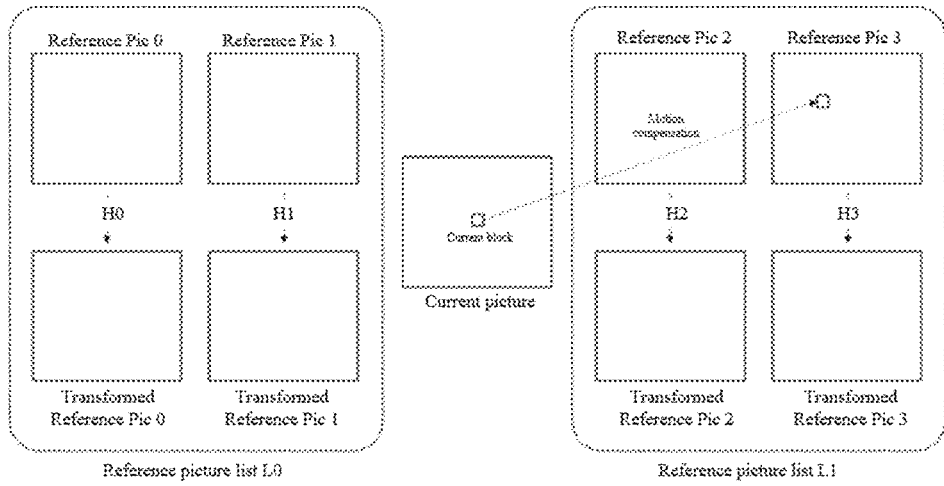

FIG. 20 illustrates another example of motion compensation for unidirectional prediction. Referring to FIG. 19, the encoder/decoder performs motion compensation by selecting a transformed reference picture 3 within the reference picture list L1.

Figure 21:
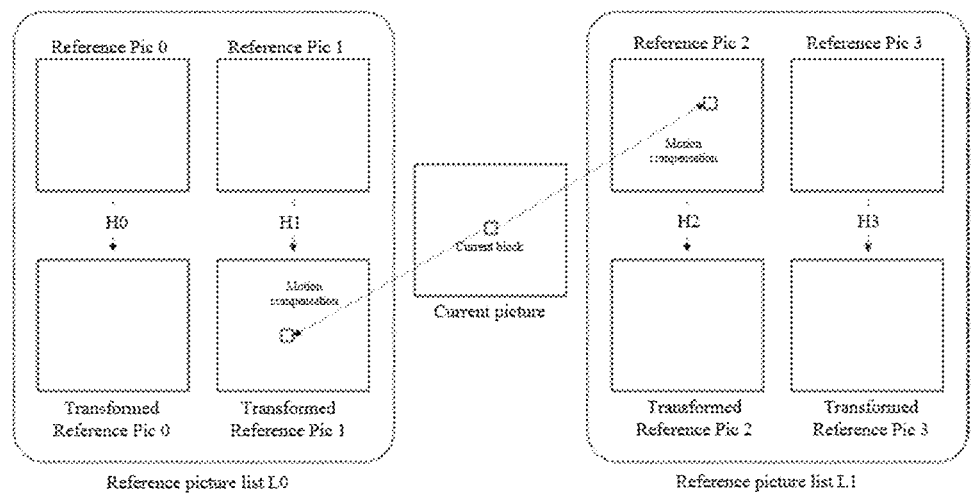

FIG. 21 illustrates an example of motion compensation for bidirectional prediction. Referring to FIG. 21, the encoder/decoder performs motion compensation by selecting a transformed reference picture 1 within the reference picture list L0 and a reference picture 3 within the reference picture list L1. In other words, the motion compensation is performed by using both the transformed reference picture 1 and the reference picture 3.

Figure 22:
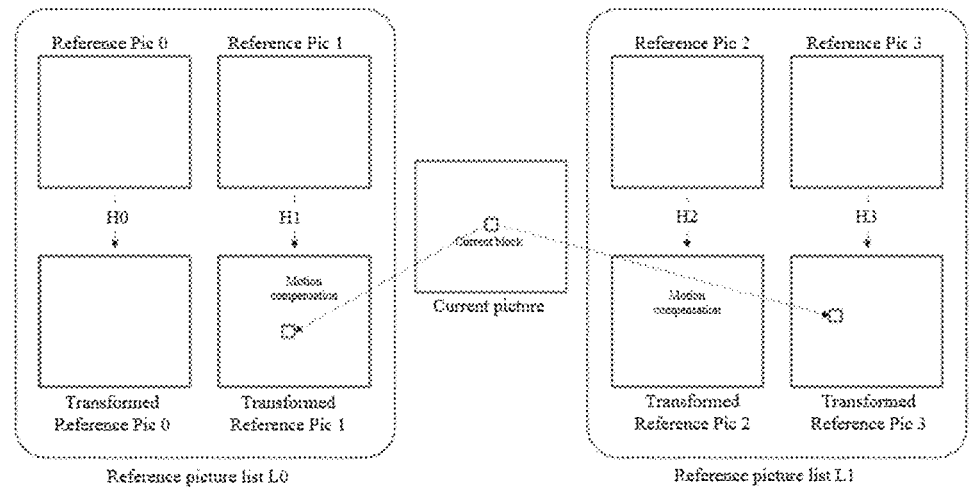

FIG. 22 illustrates another example of motion compensation for bidirectional prediction. Referring to FIG. 21, the encoder/decoder performs motion compensation by selecting the transformed reference picture 1 within the reference picture list L0 and the transformed reference picture 3 within the reference picture list L1. In other words, the motion compensation is performed by using both the transformed reference picture 1 and the transformed reference picture 3.

On the other hand, weighted prediction can be performed in the motion compensation for the bi-directional prediction of FIGS. 21 and 22. For example, weights w0 and w1 are respectively placed on a first prediction signal created by performing motion compensation in an L0 direction and a second prediction signal created by performing motion compensation in an L1 direction to create a final prediction signal.

Here, the weights w0 and w1 are values pre-defined in the encoder and the decoder.

Alternatively, the weights w0 and w1 may be determined by using weight information. The weight information may be information signaled at higher levels (a sequence level, a picture level, a tile group level, a tile level, a CTU level, etc.). In addition, the weight information is expressed in an index form. A set of weights (w0, w1) to be applied is selected from a predefined weight table.

Figure 23:
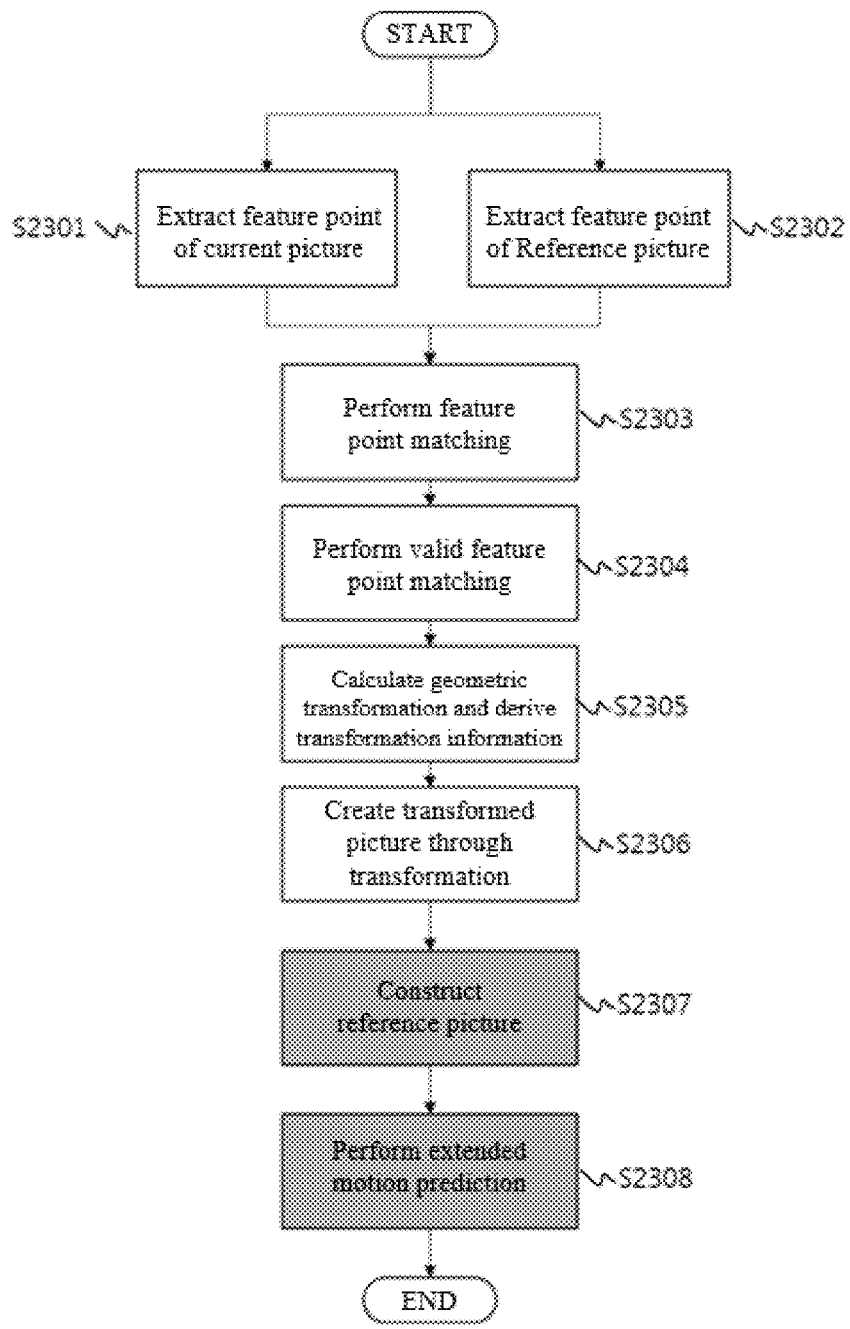
FIG. 23 is a flowchart illustrating an encoding method according to one embodiment of the present invention.

FIG. 23 is a flowchart illustrating an encoding method according to one embodiment of the present invention.

Referring to FIG. 23, first, the encoder extracts a feature point of a current picture and a feature point of a reference picture (S2301 and S2302). Two correspondence points in respective two pictures, which are used to find a mutual geometric transformation relation between the current picture and the reference picture, are defined as "feature points".

Specifically, in order to derive two correspondence points that are respectively included in two pictures, distinguishable feature points having characteristics that can be described are identified by changing the brightness of the pictures.

Next, the encoder performs a feature point matching process (S2303). However, there is a possibility that the points that deviate from a geometric transformation relation are matched due to an error occurring in the feature point matching. Accordingly, among many feature points, valid feature points that do not deviate from the geometric transformation relation are obtained so that the effective feature point matching can be performed (S2304).

The encoder calculates a relation expression between the two feature points within respective images through the valid feature point matching and derives transformation information by using the relation expression (S2305).

Next, the encoder creates a transformed reference picture by performing transformation on the reference picture on the basis of the derived transformation information (S2306).

Next, the encoder constructs a reference picture list containing the created transformed reference pictures and the reference pictures (S2307).

Next, the encoder uses the reference picture list to perform the extended motion prediction, thereby deriving optimal motion information (S2308). In this case, the extended motion prediction refers to a motion prediction method of deriving motion information by referring to the transformed reference picture as well as the reference picture.

On the other hand, the term "end" in FIG. 23 does not mean the completion of the whole encoding operation but refers to the completion of the motion prediction.

Figure 24:
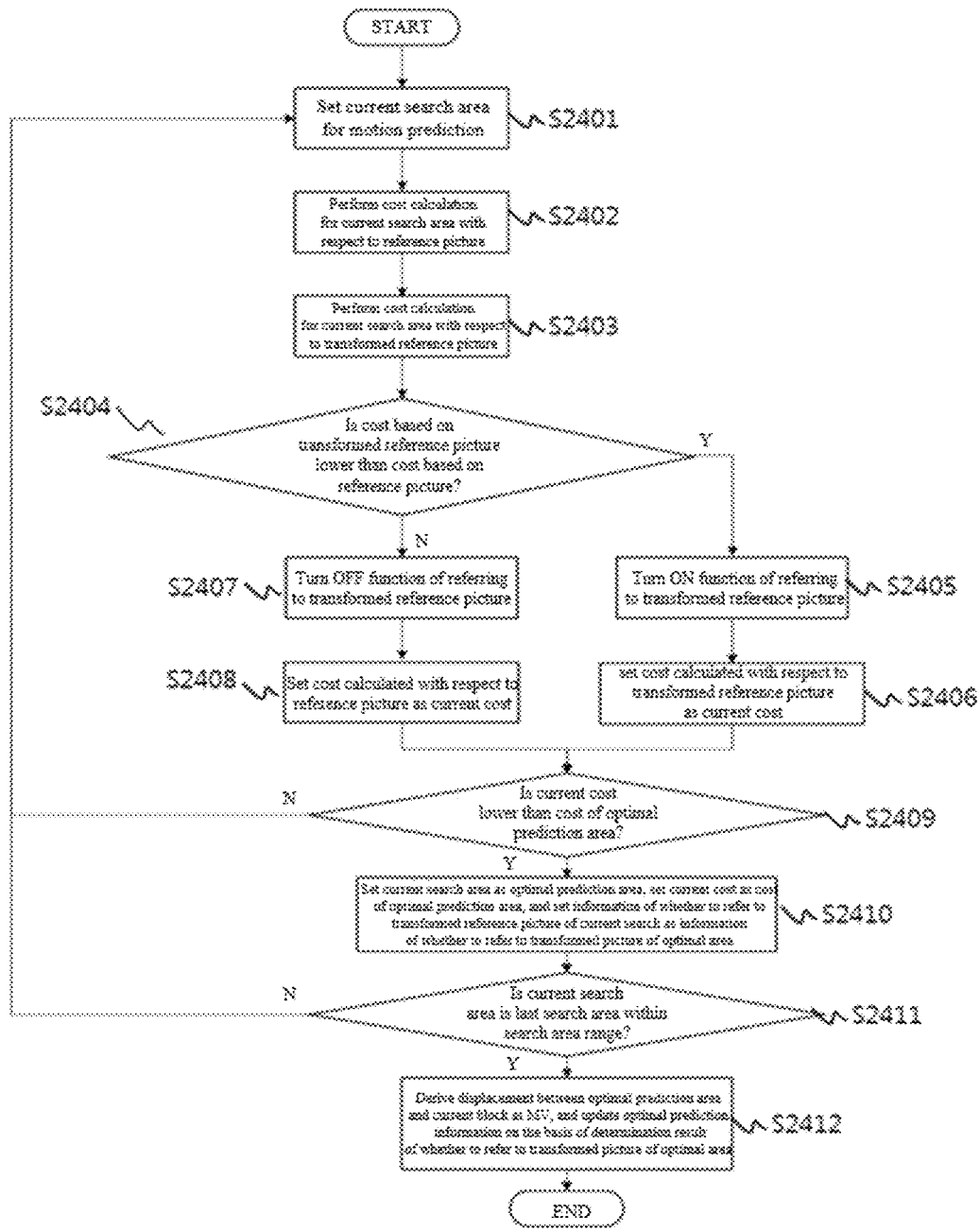
FIG. 24 is a flowchart illustrating an extended motion prediction method according to one embodiment of the present invention.

FIG. 24 is a flowchart illustrating an extended motion prediction method according to one embodiment of the present invention.

Referring to FIG. 24, the encoder sets a current search area to be used for motion prediction, to a region within a reference picture and a transformed reference picture (S2401).

Next, the encoder calculates the coding cost of the current search area in the reference picture (S2402). Here, the coding cost means cost incurred for coding.

Next, the encoder calculates the coding cost for the current area within the transformed reference picture (S2402).

Next, the encoder activates (i.e., turns on or enables) a function of referring to a transformed reference picture when the coding cost of the current search area in the transformed reference picture is lower than the coding cost of the current search area in the reference picture (S2404), and sets the coding cost of the current search area in the transformed reference picture as a current cost (S2405). Conversely, the encoder deactivates (i.e., turns off or disables) the function of referring to a transformed reference picture when the coding cost of the current search region in the transformed reference picture is not lower than the coding cost of the current search region in the reference picture (No in S2402), and sets the coding cost of the current search area in the reference picture as the current cost (S2408).

Next, the encoder advances the process to S2410 when the current cost is lower than the cost of the optimal prediction area (Yes in S2409), and the encoder returns the process to S2401 when the current cost is not lower than the cost of the optimal prediction area (No in S2409).

Next, the encoder sets the current search area as the optimal prediction area, sets the current cost as the cost of the optimal prediction area, and sets information indicating whether to refer to the transformed reference picture for the current search area, as information indicating whether to refer to the transformed reference picture for the optimal prediction area (S24010).

Next, when the current search area is the last search area within a range of search areas, the encoder derives a motion vector on the basis of a displacement between the optimal prediction area and the current block and updates transformed reference picture utilization information on the basis of the determination result of whether to refer to the transformed reference picture for the optimal prediction area (S2412). Conversely, when the current search area is not the last search area within the range of search areas (No in S2411), the encoder returns the process to S2401.

Next, the encoder encodes the motion vector and the transformed reference picture utilization information and transmit them to the decoder.

Figure 25:
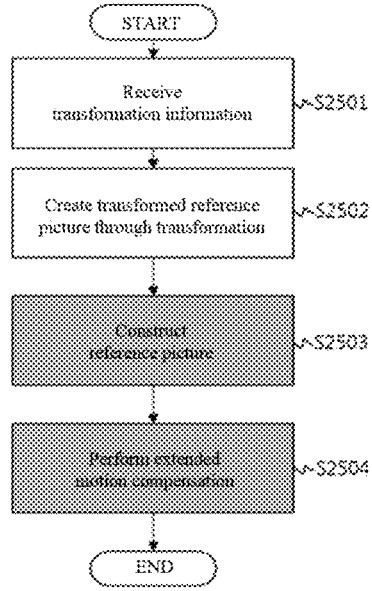
FIG. 25 is a flowchart illustrating a decoding method according to one embodiment of the present invention.

FIG. 25 is a flowchart illustrating a decoding method according to one embodiment of the present invention.

Referring to FIG. 25, first, the decoder receives transformation information (S2501).

Next, the decoder performs a transformation process using the transformation information, and creates a transformed reference picture by performing a transformation process (S2502).

Next, the decoder constructs a reference picture list by using the created transformed reference picture and the reference picture (S2503).

Next, the decoder creates a prediction signal (i.e., predicted signal) by performing extended motion compensation by using the reference picture list (S2504). Here, the extended motion prediction refers to a motion prediction method of deriving a prediction signal by referring to the transformed reference picture as well as the reference picture.

On the other hand, the term "end" in FIG. 25 does not mean the completion of the whole encoding operation but means the termination of the motion compensation which is only part of the encoding. The motion compensation method illustrated in FIG. 25 is similarly performed in the decoder.

Figure 26:
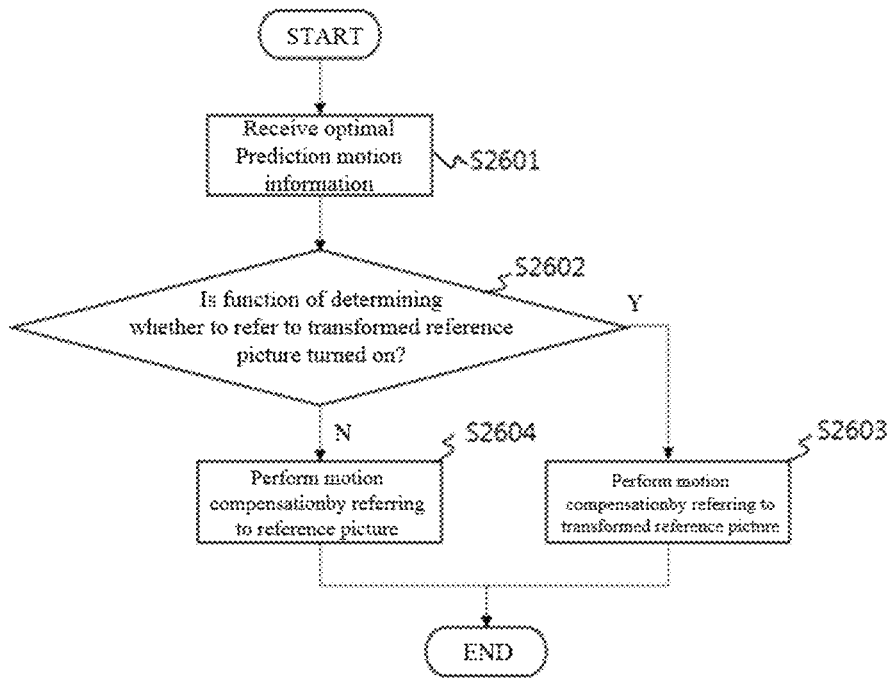
FIG. 26 is a flowchart illustrating an extended motion compensation method according to one embodiment of the present invention.

FIG. 26 is a flowchart illustrating an extended motion compensation method according to one embodiment of the present invention.

Referring to FIG. 26, the decoder receives optimal prediction motion information (S2601). Here, the optimal prediction motion information includes a motion vector, transformed reference picture utilization information, a reference picture index, etc.

Next, the decoder determines whether to activate (i.e., turn on or enable) the function of referring to the transformed reference picture (S2602). Specifically, the decoder determines whether to refer to the transformed reference picture on the basis of the transformed reference picture utilization information included in the optimal prediction motion information.

When the function of referring to a transformed reference picture is activated (Yes in S2602), the decoder performs motion compensation by referring to a transformed reference picture (S2603). Specifically, the decoder performs motion compensation by using a reference picture list containing a transformed reference picture.

Conversely, when the function of referring to a transformed reference picture is not activated (No in S2602), the decoder performs motion compensation by referring to a reference picture (S2603). Specifically, the decoder performs motion compensation by using a reference picture list containing no transformed reference pictures.

Figure 27:
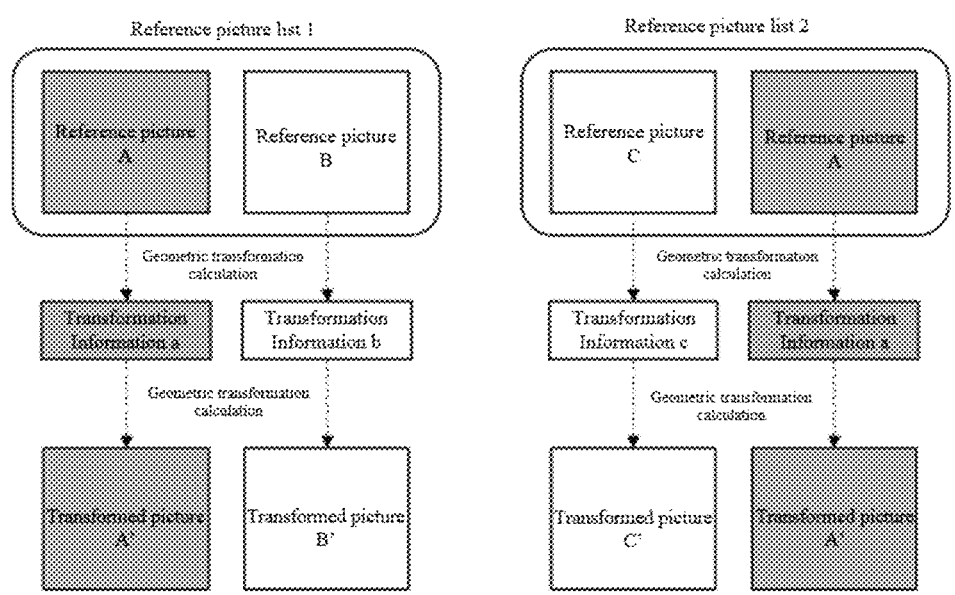
FIG. 27 is a diagram illustrating a case where a duplicate reference picture is present in a video encoder and a video decoder.

FIG. 27 is a diagram illustrating a case where a duplicate reference picture is present in a video encoder and a video decoder.

FIG. 27 illustrates a state in which two reference picture lists are constructed such that each reference picture list includes two reference pictures. Here, a reference picture A is a duplicate reference picture that exists in both the reference picture list 1 and the reference picture list 2.

Transformed pictures are created using transformation information used to derive a geometric transformation relation between a current picture and a reference picture. Thus, the reference picture list 1 and the reference picture list 2 have, in common, transformation information "a" derived by calculating the geometric transformation relation between the reference picture A and the current picture. The reference picture list 1 and the reference picture list 2 also have, in common, a transformed picture A' created on the basis of the transformation information "a".

The present invention proposes a method of improving the encoding/decoding efficiency by avoiding encoding/decoding the duplicate transformation information "a" when the duplicate reference pictures A are included within multiple reference picture lists 1 and 2 and a method of reducing the encoding/decoding complexity by not creating a duplicate transformed picture A'.

Figure 28:
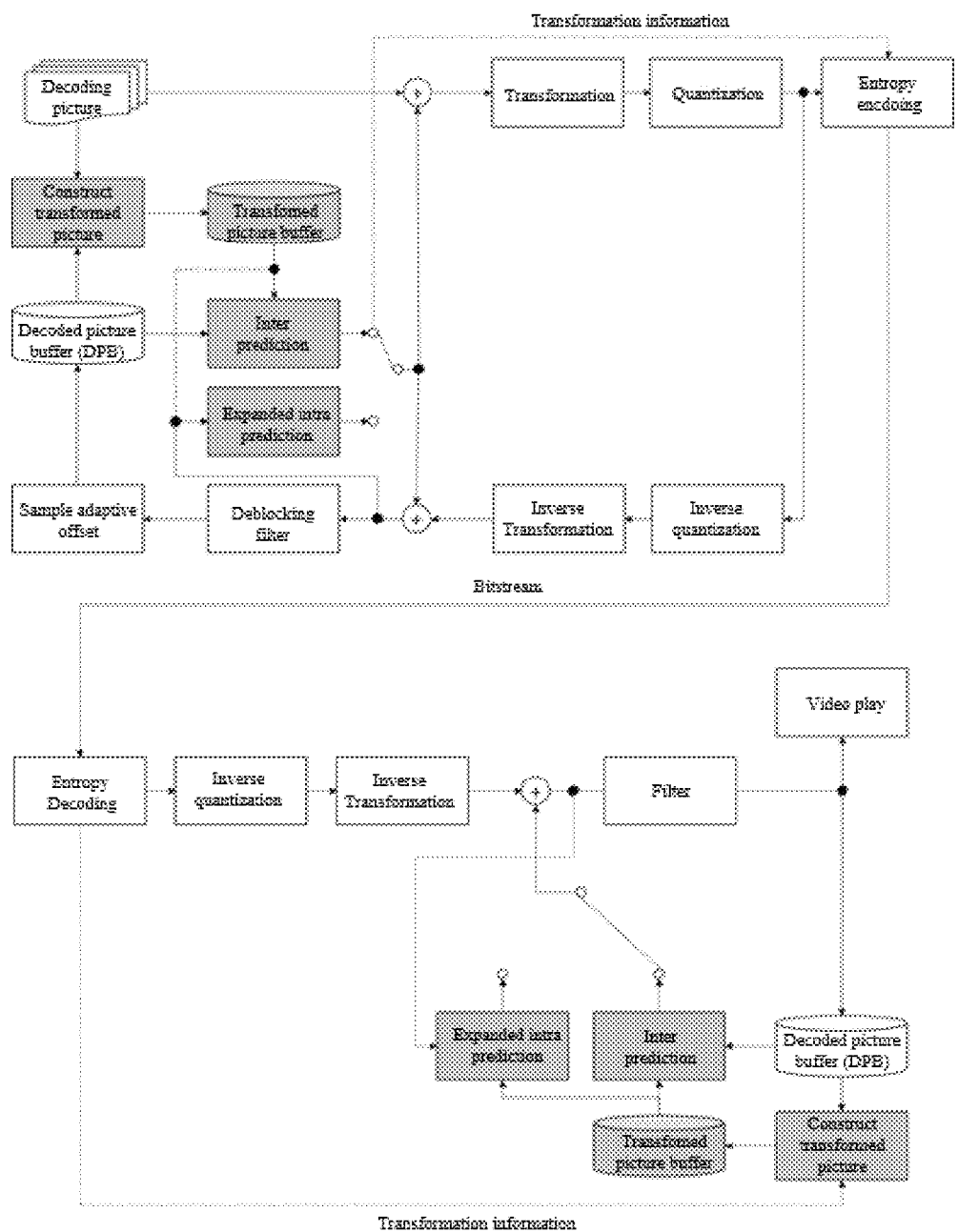
FIG. 28 is a diagram illustrating a video encoder and a video decoder that uses a transformed picture as reference information, according to one embodiment of the present invention.

FIG. 28 is a diagram illustrating a video encoder and a video decoder that uses a transformed picture for encoding or decoder, according to one embodiment of the present invention.

FIG. 28 illustrates the overall schematic construction of the video encoder and the video decoder that use reference pictures and transformed pictures as reference information. In inter prediction, the video encoder refers to a reference picture stored in a decoded picture buffer and a transformed picture stored in a transformed picture buffer as reference information for inter prediction. The transformed picture that is referred to is a picture created by calculating a geometric transformation relation between a coding picture (i.e. current picture) to be coded and a reference picture of the current picture to derive transformation information. The transformed picture is created according to the derived transformation information.

Here, the derived transformation information is entropy-encoded and then transmitted to the video decoder in a bitstream form. The video decoder decodes the transformation information by performing entropy decoding. The video decoder creates a transformed picture from a reference picture stored in a decoded picture buffer by using decoded transformation information and stores the transformed picture into a transformed picture buffer. The video decoder then uses the stored transformed picture as reference information for inter prediction.

When reference information for inter prediction can be accessed at the time of performing intra prediction, the video encoder and decoder that use transformed pictures as reference information performs extended intra prediction in which transformed picture information is used as reference information for intra prediction.

Figure 29:
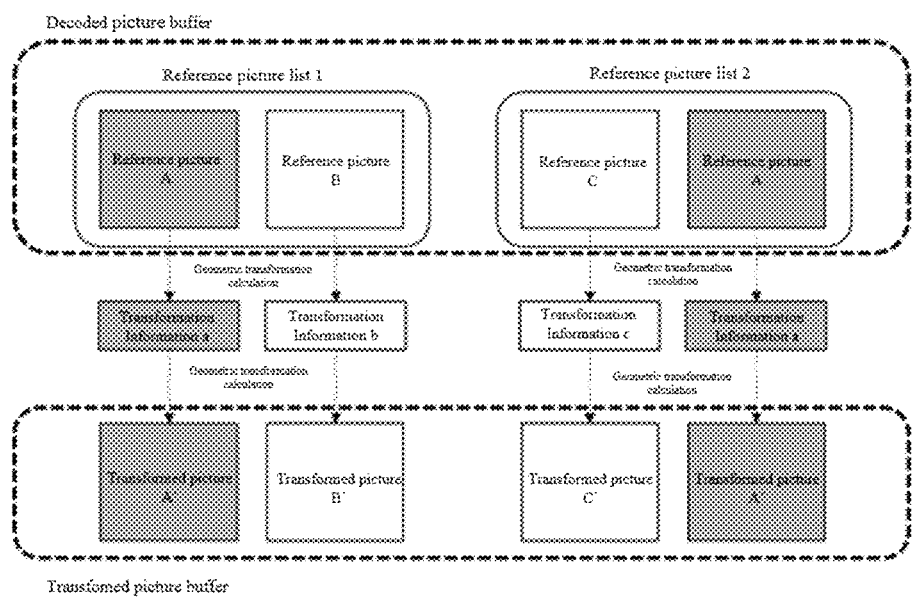
FIG. 29 is a diagram illustrating how reference pictures are organized in a decoded picture buffer and how transformed pictures are organized in a transformed picture buffer, according to one embodiment of the present invention.

FIG. 29 is a diagram illustrating the construction of a reference picture in a decoded picture buffer and the construction of a transformed picture in a transformed picture buffer, according to one embodiment of the present invention;

FIG. 29 illustrates the composition of reference pictures in a decoded picture buffer and the composition of transformed pictures in a transformed picture buffer in the encoder and decoder that use transformed pictures. The video encoder and decoder retain one or more reference picture lists in the decoded picture buffer, and each reference picture list contains one or more reference pictures.

When multiple reference picture lists are provided in the decoded picture buffer, there is a case where the same reference picture such as a reference picture A in FIG. 6 is commonly present in the multiple reference picture lists. In this case, in the process of deriving the transformation information in the video encoder and decoder, there is a case where transformation information "a" derived from a reference picture A within a reference picture list 1 is identical to the transformation information "a" derived from a reference picture A within a reference picture list 2. Transformed pictures A' configured with the identical transformation information "a" are also identical to each other. The transformation information derived by the video encoder is transmitted to the video decoder. Accordingly, in the situation described above, duplicate transformation information "a" is transmitted multiple times. Therefore, the encoding/decoding efficiency is deteriorated. Since a duplicate transmitted picture A" is created multiple times unnecessarily, the encoding/decoding complexity is increased.

Figure 30:
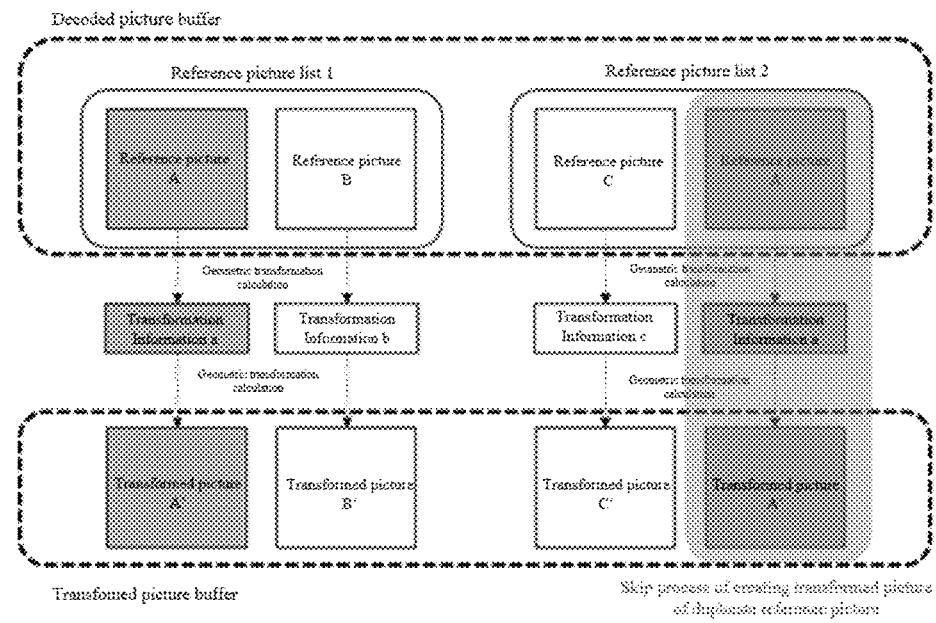
FIG. 30 is a diagram illustrating a method of skipping a transformed picture creation process for a duplicate reference picture, according to one embodiment of the present invention.

FIG. 30 is a diagram illustrating a method of skipping a process of creating a transformed picture of a duplicate reference picture, according to one embodiment of the present invention.

FIG. 30 shows an example of skipping the process of creating a transformed picture of a duplicate reference picture that is present in both of the decoded picture buffer and the transformed picture buffer of the video encoder and decoder that use transformed pictures as reference information. In the video encoder, when there is a duplicate reference picture A that is commonly present in the reference picture lists, the video encoder skips the process of driving the transformation information for the duplicate reference picture and of creating the transformed picture thereof, and do not transmit the duplicate transformation information "a". By not transmitting duplicate transformation information to the decoder, it is possible to avoid performing redundant processes such as derivation of duplicate transformation data, encoding/decoding of duplicate transformation data, and creation of duplicate transformed pictures. Therefore, it is possible to improve encoding/decoding efficiency and to reduce encoding/decoding complexity.

FIGS. 29 and 30 illustrate a case where there are two reference picture lists and each reference picture list includes two reference pictures. However, the invention is not intended to limit the number of reference picture lists and the number of reference pictures included in each list. The number of reference picture lists is not limited to two but can be N, and the number of reference pictures in each list is not limited to two but can be M. Here, N may be an integer of 2 and M may be an integer equal to or greater than 1. In addition, when there are multiple reference picture lists, each reference list can contain a different number of reference pictures.

Figure 31:
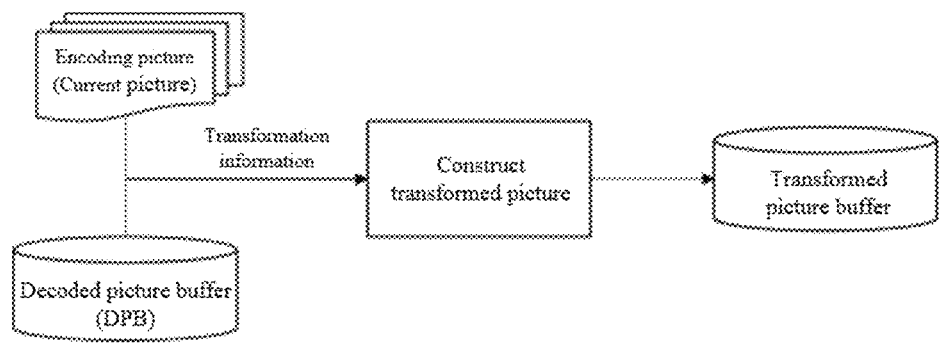
FIG. 31 is a diagram illustrating a method of constructing a transformed picture in a video encoder.
Figure 32:
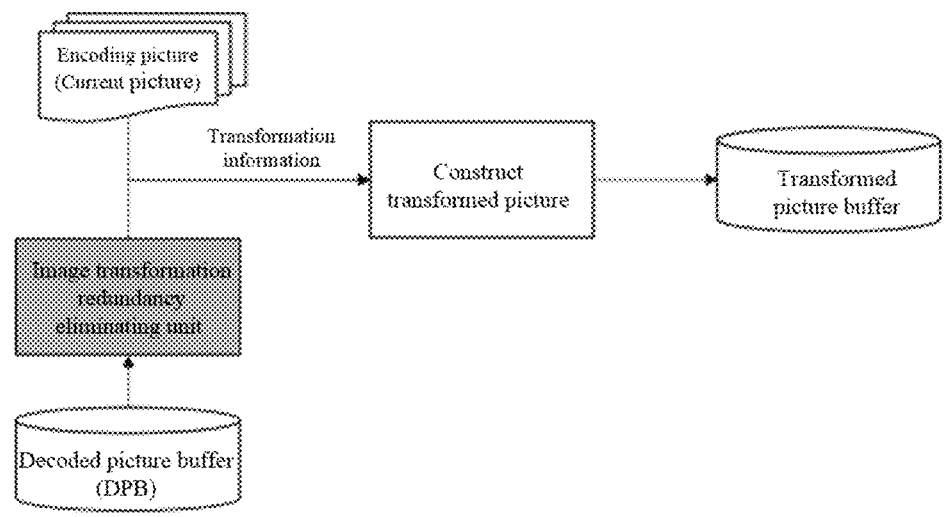
FIG. 32 is a diagram illustrating a method of constructing a transformed picture in a video encoder according to one embodiment of the present invention.

FIG. 31 is a diagram showing how a video encoder constructs a transformed picture, and FIG. 32 is a diagram showing how a video encoder according to one embodiment of the present invention constructs a transformed picture.

FIG. 31 shows a transformed picture construction process performed by the video encoder. The video encoder derives transformation information from a current picture and a reference picture stored in the decoded picture buffer. The video encoder creates a transformed picture by processing the derived reference picture and stores the created transformed picture in the transformed picture buffer.

According to the invention, in order to avoid creating redundant transformed pictures from duplicate reference pictures stored in the decoded picture buffer, an image transformation redundancy eliminating unit shown in FIG. 32 is provided. The image transformation redundancy eliminating unit determines whether there are duplicate reference pictures in the decoded picture buffer. The image transformation redundancy eliminating unit prevents transformation information for duplicate reference pictures from being derived and encoded and prevents transformed pictures of the duplicate reference pictures from being created, thereby preventing redundant transformation information (i.e., duplicate transformation information) from being transmitted to the decoder. Thus, the image transformation redundancy eliminating unit improves the encoding/decoding efficiency and reduces the encoding/decoding complexity by eliminating the process of creating duplicate transformed pictures. Whether there are duplicate reference pictures in the reference picture buffer is determined on the basis of reference picture composition status or reference picture composition information such as a reference picture set (RPS).

Figure 33:
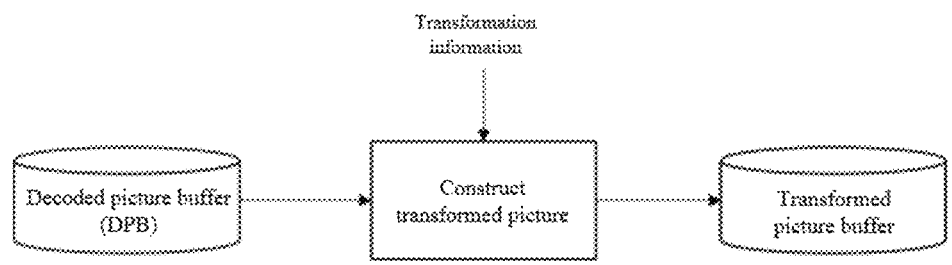
FIG. 33 is a diagram illustrating a method of constructing a transformed picture in a video decoder.

FIG. 33 is a diagram showing how a video decoder constructs a transformed picture, and FIG. 32 is a diagram showing how a video decoder according to one embodiment of the present invention constructs a transformed picture.

FIG. 33 shows a transformed picture construction process performed by the video decoder. The video decoder creates a transformed picture by processing a reference picture stored in the decoded picture buffer according to the transformation information received from the video encoder and stores the created transformed picture in the transformed picture buffer.

Figure 34:
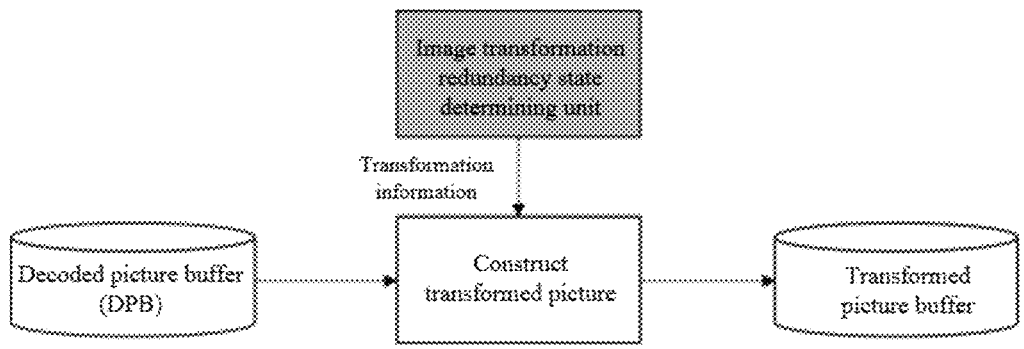
FIG. 34 is a diagram illustrating a method of constructing a transformed picture in a video decoder according to one embodiment of the present invention.

According to the present invention, the video encoder according to the present invention has a function of skipping transmission of duplicate transformation information. Accordingly, the video decoder includes an image transformation redundancy state determining unit shown in FIG. 34. When a current state is determined to be a transformation information redundancy state, the image transformation duplication determining unit skips a series of processes associated with the creation of the transformation information. The image transformation redundancy state determining unit determines a reference picture redundancy state, i.e., determines whether there is a duplicate reference picture in the same manner as in the video encoder. When the determination result is affirmative, a series of processes associated with the creation of the transformation information of a duplicate reference picture are skipped.

The encoding method and the decoding method described below are performed by an image redundancy eliminating unit of the video encoder or the image transformation redundancy state determining unit of the video decoder that are described above. The term "end" in the drawings does not mean completion of the entire encoding/decoding procedure but means finishing of only an operation (i.e., motion prediction and/or motion compensation) related with the present invention.

In FIGS. 31 to 34, the transformed picture buffer and the decoded picture buffer are illustrated as separate buffers. However, a single buffer that can store both the transformed pictures and the reconstructed pictures may be used instead of the separate buffers. In this case, the transformed pictures created by processing the reconstructed pictures are stored in the decoded picture buffer.

In addition, the created transformed picture is inserted into the reference picture list. For example, when a specific reference picture listed in a first reference picture list is processed to form a transformed picture, the transformed picture is added to the first reference picture list. Similarly, when a specific reference picture contained in a second reference picture list is processed to form a transformed picture, the transformed picture is added to the second reference picture list.

For example, when a transformed picture created from a certain reference picture within the first reference picture list is added to the first reference picture list, the first reference picture list contains the added transformed pictures as well as the existing reference pictures.

Alternatively, the transformed pictures can be organized into an additional reference picture list. Herein, a list into which the transformed pictures can be inserted is as a transformed picture list. The transformed reference picture list is configured to include the transformed pictures created from the respective reference pictures contained the first reference picture list and the transformed pictures created from the respective reference pictures contained in the second reference picture list. Alternatively, there may be multiple transformed reference picture lists. In each of the transformed reference picture lists, transformed pictures transformed from reference pictures within one of the multiple reference picture lists are organized. For example, a first transformed picture list is defined in which transformed pictures generated from respective reference pictures contained a first reference picture list are organized. Similarly, a second transformed reference picture list is defined in which transformed reference pictures generated from respective reference pictures contained in a second reference picture list are organized. The transformed reference picture lists are stored in the transformed picture buffer illustrated in FIGS. 8 to 11.

According to one embodiment of the invention, when there are duplicate reference pictures within multiple reference picture lists, transmission of the transformation information for the duplicate reference pictures and creation of the transformed pictures of the duplicate reference pictures are not performed.

Figure 35:
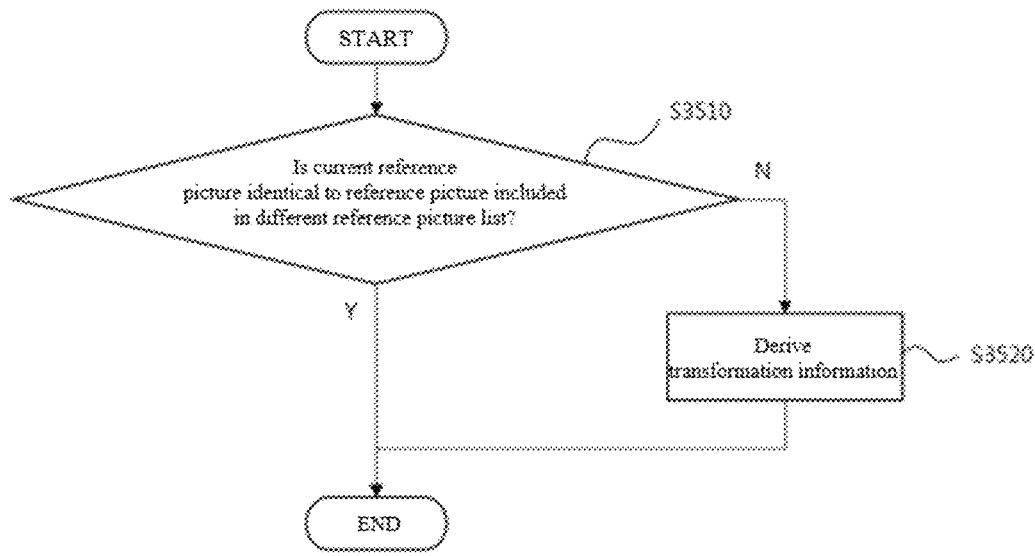
FIG. 35 is a flowchart illustrating a method in which a video encoder according to one embodiment of the present invention of skips derivation of transform information for a duplicate reference picture.

FIG. 35 is a flowchart illustrating a method in which the video encoder according to one embodiment of the present invention skips derivation of transformation information for a duplicate reference picture.

Referring to FIG. 35, the video encoder determines whether a current reference picture contained in a certain reference picture list is identical to a reference picture that is contained in a different reference picture list (S3510).

When it is determined that the current reference picture is not a picture that is identical to a reference picture contained in a different reference picture list (No in S3510), the video encoder derives transformation information for the current reference picture (S3520).

That is, as illustrated in FIG. 35, the video encoder checks the composition of reference pictures in each of multiple reference picture lists. When there are duplicate reference pictures in the multiple reference picture lists, derivation of the transformation information for the duplicate reference pictures is skipped.

Figure 36:
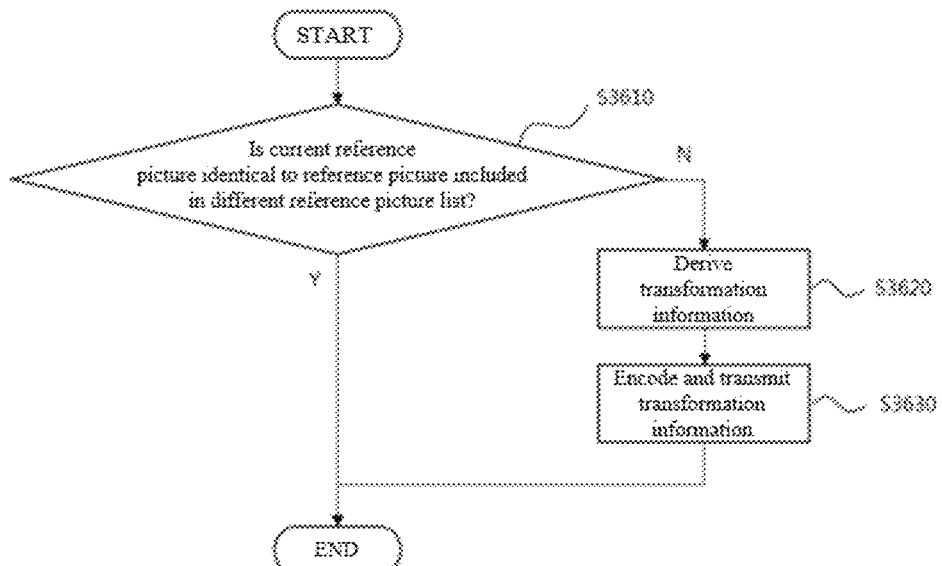
FIG. 36 is a flowchart illustrating a method in which a video encoder according to one embodiment of the present invention skips derivation, encoding, and transmission of transformation information for a duplicate reference picture.
Figure 37:
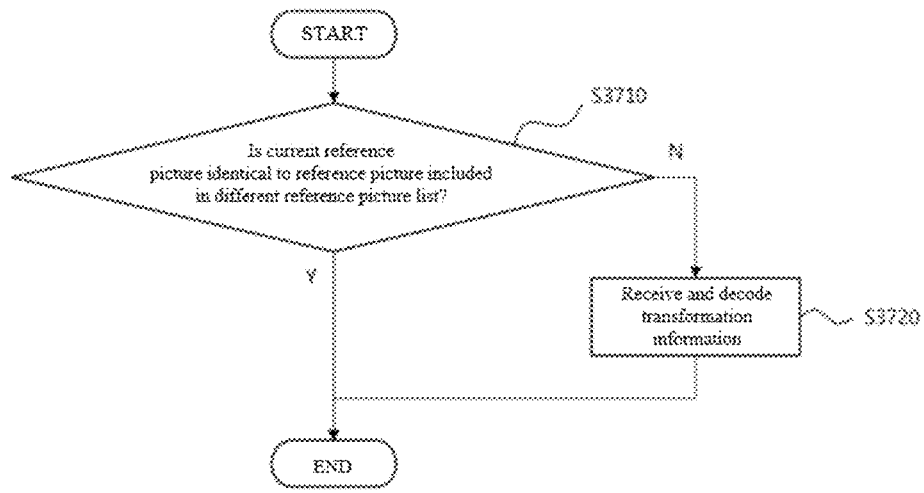
FIG. 37 is a flowchart illustrating a method in which a video decoder according to one embodiment of the present invention skips reception and decoding of transformation information for a duplicate reference picture.

FIG. 36 is a flowchart illustrating a method in which the video encoder according to one embodiment of the present invention skips derivation, encoding, and transmission of transformation information for duplicate reference pictures. FIG. 37 is a flowchart illustrating a method in which the video decoder according to one embodiment of the present invention skips reception and decoding of transformation information for duplicate reference pictures.

Referring to FIG. 36, the video encoder determines whether a current reference picture is identical to a reference picture contained in any different reference picture list (S3610).

When it is determined that the current reference picture is not identical to a reference picture contained in any reference picture list (No in S3610), the video encoder derives transformation information for the current reference picture (S3620). Next, the video encoder transmits the derived transformation information to the video decoder (S3630).

Referring to FIG. 37, the video decoder determines whether a current reference picture is identical to a reference picture contained in any reference picture list (S3710).

When it is determined that the current reference picture is not identical to a reference picture contained in any reference picture list (No in S3710), the video decoder derives transformation information for the current reference picture (S3720).

The video encoder/decoder checks the composition of reference pictures in each of multiple reference picture lists and transmits or receives transformation information for each of the reference pictures when there are no duplicate reference pictures in the multiple reference picture lists. In other words, the video encoder checks the composition of reference pictures in each of multiple reference picture lists and skips transmission of transformation information for duplicate reference pictures when the duplicate reference pictures are present in the multiple reference picture lists. On the other hand, the video decoder checks the composition of reference pictures in each of multiple reference picture lists and skips reception of transformation information for duplicate reference pictures when the duplicate reference pictures are present in the multiple reference picture lists.

Figure 38:
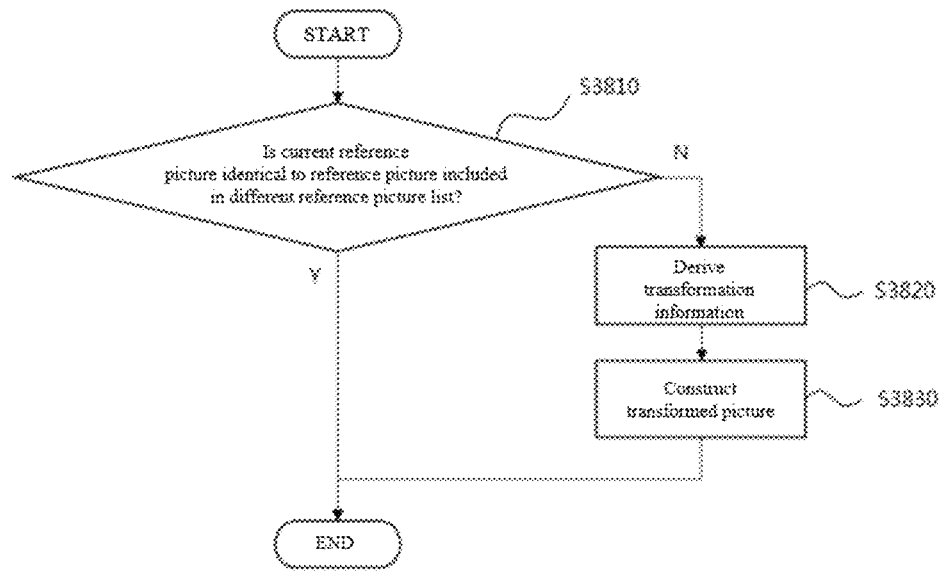
FIG. 38 is a flowchart illustrating a method in which a video encoder according to one embodiment of the present invention skips derivation of transformation information and creation of a transformed picture of a duplicate reference picture.
Figure 39:
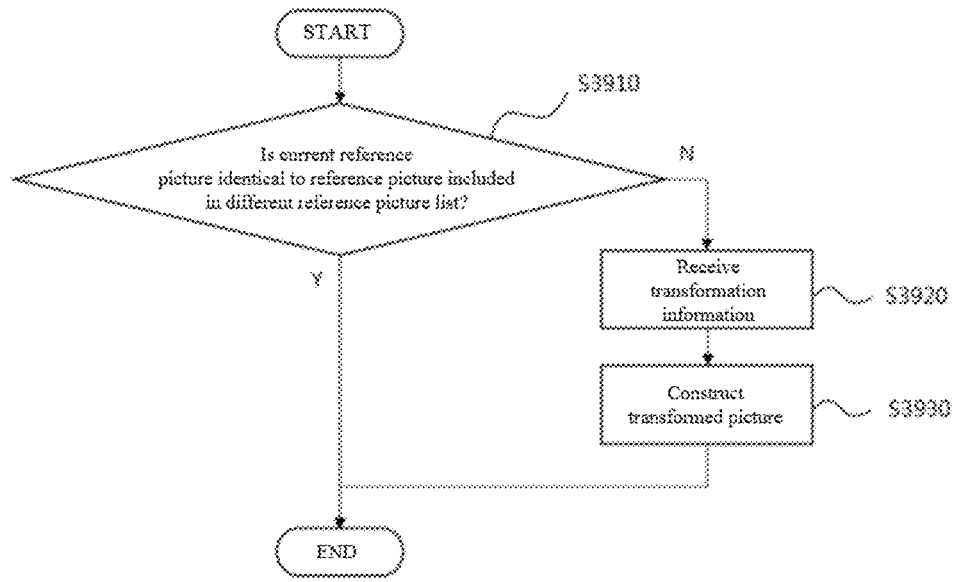
FIG. 39 is a flowchart illustrating a method in which a video decoder according to one embodiment of the present invention skips reception of transformation information and creation of a transformed picture of a duplicate reference picture.

FIG. 38 is a flowchart illustrating a method in which the video encoder according to one embodiment of the present invention skips derivation of transformation information for duplicate reference pictures and creation of transformed pictures of the duplicate reference pictures. FIG. 39 is a flowchart illustrating a method in which the video decoder according to one embodiment of the present invention skips reception of transformation information for the duplicate reference pictures and creation of transformed pictures of the duplicate reference pictures.

Referring to FIG. 38, the video encoder determines whether a current reference picture is identical to a reference picture contained in a different reference picture list (S3810).

When it is determined that the current reference picture is not identical to a reference picture contained in a different reference picture list (No in S3810), the video encoder derives transformation information for the current reference picture (S3820). Next, the video encoder uses the derived transformation information to create a transformed picture of the current reference picture (S3830).

Referring to FIG. 39, the video decoder determines whether a current reference picture is identical to a reference picture contained in a different reference picture list (S3910).

When it is determined that the current reference picture is not identical to a reference picture contained in a different reference picture list (No in S3910), the video decoder receives the transformation information for the current reference picture (S3920). Next, the video decoder uses the derived transformation information to create a transformed picture of the current reference picture (S3930).

The video encoder/decoder checks the composition of reference pictures in each of multiple reference picture lists and transmits or receives transformation information for each of the reference pictures when there are no duplicate reference pictures in the multiple reference picture lists. In other words, the video encoder checks the composition of reference pictures in each of multiple reference picture lists and skips transmission of transformation information for duplicate reference pictures and creation of transformed pictures of the respective duplicate reference pictures when the duplicate reference pictures are present in different reference picture lists. On the other hand, the video decoder checks the composition of reference pictures in each of multiple reference picture lists and skips reception of transformation information for duplicate reference pictures and creation of transformed pictures of the respective duplicate reference pictures when the duplicate reference pictures are present in different reference picture lists.

Figure 40:
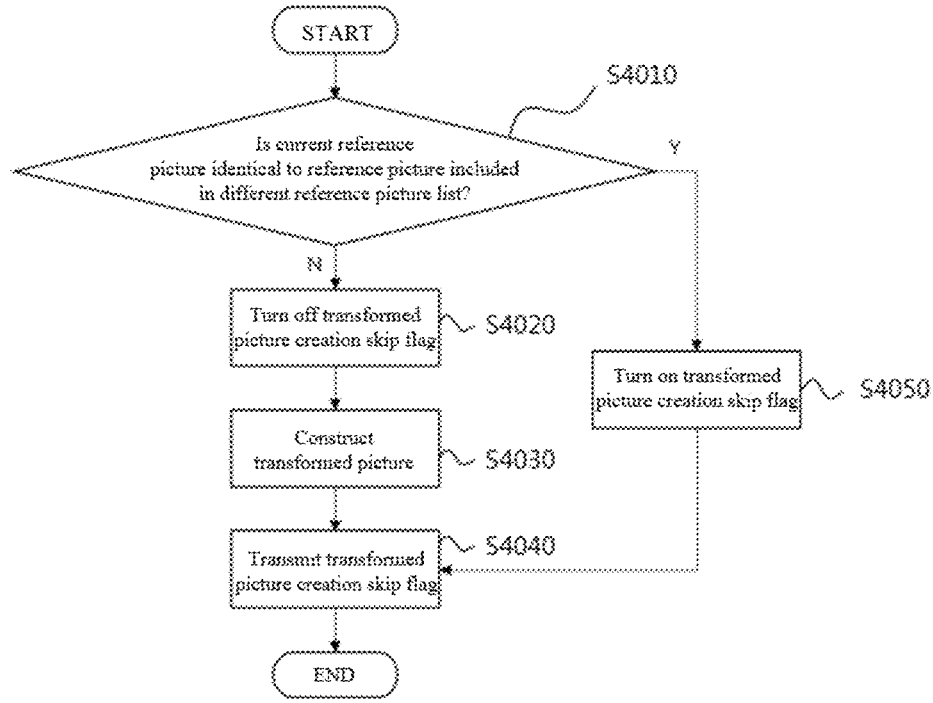
FIG. 40 is a flowchart illustrating a method in which a video encoder according to one embodiment of the present invention skips creation of a transformed picture of a duplicate reference picture by referring to the value of a flag.
Figure 41:
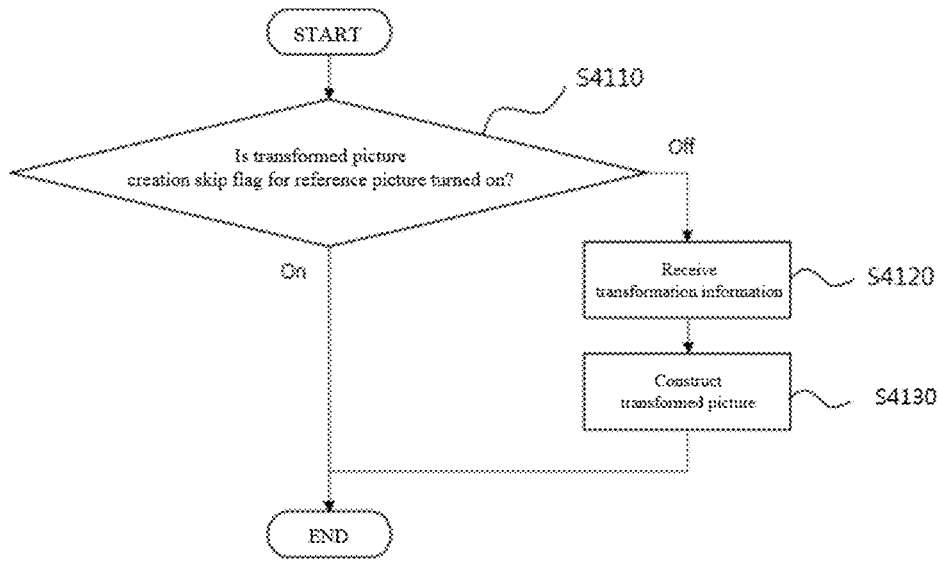
FIG. 41 is a flowchart illustrating a method in which a video decoder according to one embodiment of the present invention skips creation of a transformed picture of a duplicate reference picture by referring to the value of a flag.

FIG. 40 is a flowchart illustrating a method in which the video encoder according to one embodiment of the present invention skips creation of transformed pictures of respective duplicate reference pictures by using flags, and FIG. 41 is a flowchart illustrating a method in which the video decoder according to one embodiment of the present invention skips creation of transformed pictures of respective duplicate reference pictures using flags.

According to the present invention, transformed picture creation skip information indicating whether to create a transformed picture of a reference picture is defined.

For example, the transformed picture creation skip information may be information indicating a reference picture that is not to undergo transformation for production of a transformed picture, among the reference pictures organized in the reference picture lists. For example, the transformed picture creation skip information is an index indicating at least one of the reference pictures organized in the reference picture lists. Alternatively, the transformed picture creation skip information may be an index indicating several reference pictures of the reference pictures in the reference picture lists.

Alternatively, the transformed picture creation skip information may have the form of a flag value. The transformed picture creation skip information may be a value that is preset in the video encoder or the decoder. Alternatively, it may be a value signaled to the video decoder from the video encoder.

Alternatively, when the composition of duplicate reference pictures in reference picture lists is pre-defined or predetermined, the transformed picture creation skip information is inserted into information indicating a method of organizing each of the reference picture lists, either explicitly or implicitly. In this case, the information indicating a method of organizing the reference picture lists is signaled from the encoder to the decoder. The video decoder creates reference picture lists or transformed picture lists containing transformed pictures on the basis of the information indicating the method of organizing the reference picture lists.

For example, when a transformed picture creation skip flag has a first value, a process of creating a transformed picture of a specific reference picture is skipped. On the other hand, when the transformed picture creation skip flag has a second value, the process of creating a transformed picture of a specific reference picture is performed. For example, the first and second values may be 0 and 1, respectively or vice versa.

Referring to FIG. 40, the video encoder determines whether a current reference picture is identical to a reference picture contained in a different reference picture list (S4010).

When the current reference picture is not a picture that is identical to a reference picture contained in a different reference picture list (No in S4010), the video encoder sets the transformed picture creation skip flag to the second value (S4020). In this case, the video encoder performs the process of creating a transformed picture (S4030).

On the other hand, when the current reference picture is a picture that is identical to a reference picture contained in a different reference picture list (Yes in S4010), the video encoder sets the transformed picture creation skip flag to the first value (S4050).

Subsequently, the value of the transformed picture creation skip flag, which is determined in step S4020 or step S4050, is transmitted to the video decoder (S4040).

Referring to FIG. 41, the video decoder checks the value of the transformed picture creation skip flag transmitted from the video encoder (S4110).

When the transformed picture creation skip flag which is currently transmitted has the second value (Off in S4110), the video decoder receives the transformation information for the current reference picture (S4120). Next, the video decoder uses the derived transformation information to create a transformed picture of the current reference picture (S4130).

The video encoder checks the composition of reference pictures in each of multiple reference picture lists. When there are no duplicate reference pictures in different reference picture lists, the transformed picture creation skip flag for a duplicate reference picture is set to the first value, the flag is transmitted, and the process of creating a transformed picture is skipped. On the other hand, for the remaining reference pictures that are not duplicate reference pictures, the transformed picture creation skip flag is set to the second value, the flag is transmitted, and the process of creating a transformed picture is performed. On the other hand, the video decoder receives the transformed picture creation skip flag and skips or performs a process of creating a transformed picture, depending on the value of the transformed picture creation skip flag.

Alternatively, the video encoder may check the composition of reference pictures in each of multiple reference picture lists, and create and encode the transformed picture creation skip information indicating a target reference picture when there are duplicate reference pictures in the multiple reference picture lists. The video decoder performs or skips the process of creating a transformed picture of a specific reference picture contained in a reference picture list on the basis of the transformed picture creation skip information that is signaled from the video encoder.

Alternatively, the video encoder may determine whether to perform a transformation process on a specific reference picture on the basis of coding parameters.

The transformed picture creation process performed by the video encoder includes derivation of transformation information, transmission of the transmission information, and creation of a transformed picture. The transformed picture creation process performed by the video decoder includes reception of the transformation information and creation of a transformed picture.

According to one embodiment of the invention, when there are reference picture lists that are identical in terms of the composition of reference pictures contained therein, transmission and reception of transformation information for the reference pictures in the duplicate reference picture lists are skipped, and creation of transformed pictures of the reference pictures are also skipped.

Figure 42:
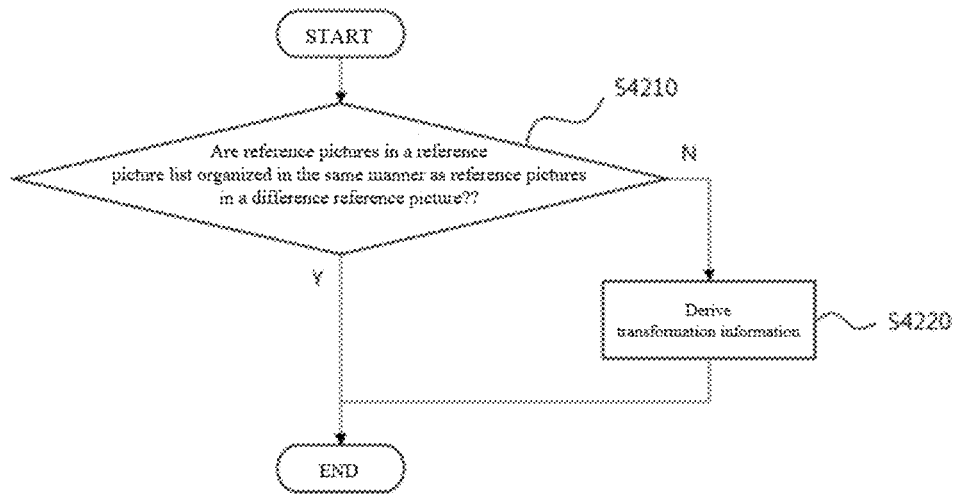
FIG. 42 is a flowchart illustrating a method in which a video encoder according to one embodiment of the present invention skips derivation of transformation information for duplicate reference pictures in reference picture lists.

FIG. 42 is a flowchart illustrating a method in which the video encoder according to one embodiment of the present invention skips derivation of transformation information for reference pictures that are included in duplicate reference picture lists.

Referring to FIG. 42, the video encoder determines whether the reference pictures in a current reference picture list are the same as the reference pictures in a specific reference picture list (S4210).

When the reference pictures in the current reference picture list are not the same as the reference pictures in the specific reference picture list (No in S4210), the video encoder derives transformation information for the reference pictures included in the current reference picture list (S4220).

That is, as illustrated in FIG. 42, the video encoder checks the composition of reference pictures within a current reference picture list. When it is determined that the reference pictures in a specific reference picture list are the same as the reference pictures in the current reference picture list, derivation of transformation information is omitted for the current picture and the reference pictures that occur in duplicate within the current reference picture list and the specific reference picture list.

Figure 43:
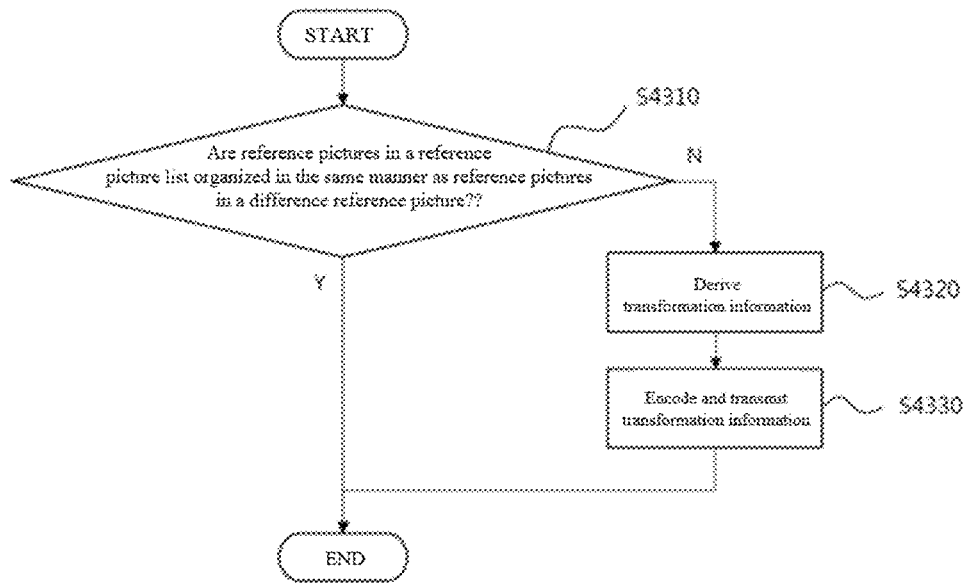
FIG. 43 is a flowchart illustrating a method in which a video encoder according to one embodiment of the present invention skips derivation, encoding, and transmission of transformation information for duplicate reference pictures in reference picture lists.
Figure 44:
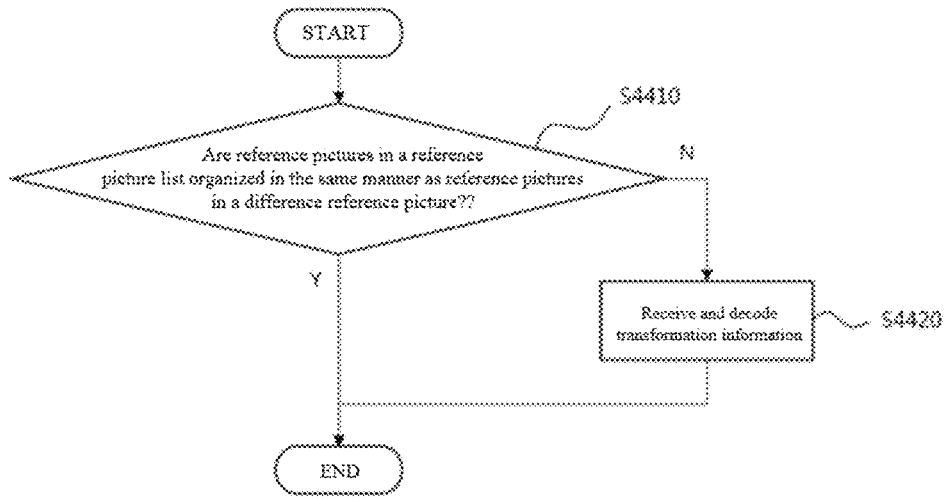
FIG. 44 is a flowchart illustrating a method in which a video decoder according to one embodiment of the present invention skips reception and decoding of transformation information for duplicate reference pictures in reference picture lists.

FIG. 43 is a flowchart illustrating a method in which the video encoder according to one embodiment of the present invention skips derivation, encoding, and transmission of transformation information for duplicate reference pictures in the compared reference picture lists. FIG. 44 is a flowchart illustrating a method in which the video decoder according to one embodiment of the present invention skips reception and decoding of transformation information for the duplicate reference pictures within the compared reference picture lists.

Referring to FIG. 43, the video encoder determines whether the composition of reference pictures in a current reference picture list is the same as the composition of reference pictures in another reference picture list (S4310).

When the composition of reference pictures in the current reference picture list is not the same as the composition of reference pictures in another reference picture list (No in S4310), the video encoder derives transformation information of the reference pictures within the current reference picture list (S4320). Next, the video encoder transmits the derived transformation information to the video decoder (S4330).

Referring to FIG. 44, the video decoder determines whether the composition of reference pictures in a current reference picture list is the same as the composition of reference pictures in another reference picture list (S4410).

When the composition of reference pictures in the current reference picture list is not the same as the composition of reference pictures in a specific reference picture list (No in S4410), the video decoder receives the transformation information for the reference pictures in the current reference picture list and decodes the transformation information (S4220).

The video encoder and the video decoder check the composition of reference pictures in each of multiple reference picture lists. When the composition of reference pictures in a current reference picture list is not the same as the composition of reference pictures in a specific reference picture list, the video encoder and the video decoder transmits and receives transformation information for the reference pictures. That is, the video encoder checks the composition of reference pictures in each of multiple reference picture lists. When the composition of reference pictures in a current reference picture list is the same as the composition of reference pictures in a specific reference picture list, the video encoder skips transmission of the transformation information for the reference pictures in the current reference picture list. On the other hand, the video decoder checks the composition of reference pictures in each of multiple reference picture lists. When the composition of reference pictures in a current picture list is the same as the composition of reference pictures in a specific reference picture list, the video decoder skips reception of the transformation information for the reference pictures.

Figure 45:
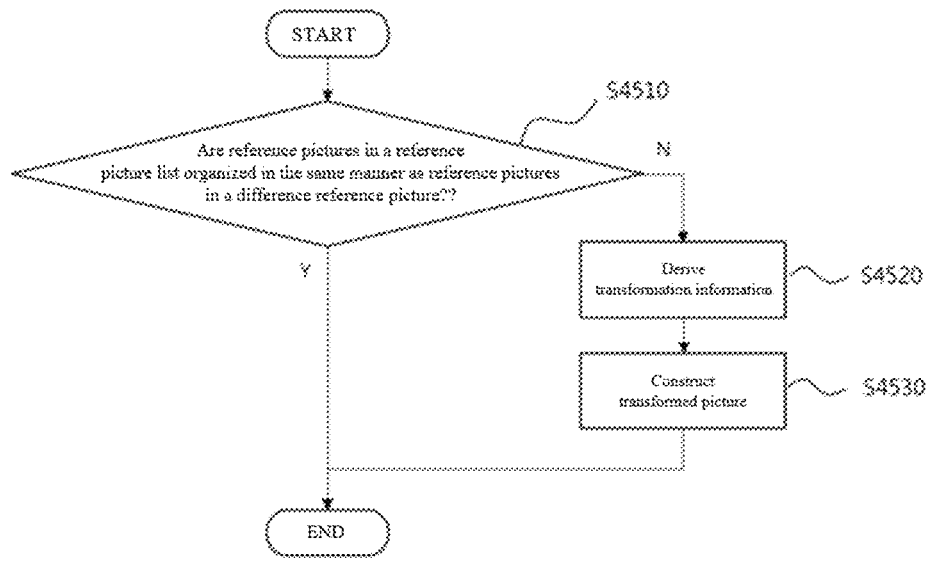
FIG. 45 is a flowchart illustrating a method in which a video encoder according to one embodiment of the present invention skips derivation of transformation information and creation of transformed pictures of duplicate reference pictures in reference picture lists.
Figure 46:
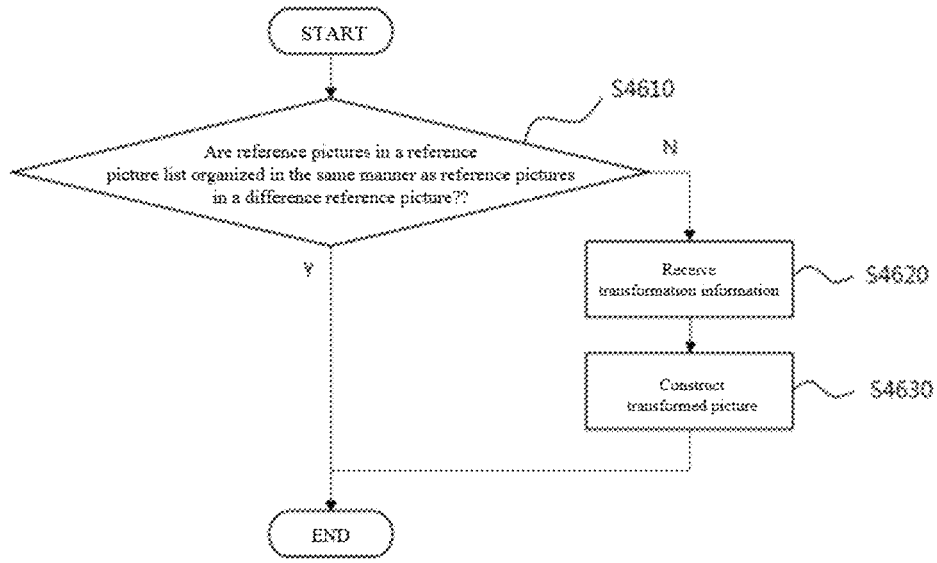
FIG. 46 is a flowchart illustrating a method in which a video decoder according to one embodiment of the present invention skips reception of transformation information and creation of transformed pictures of duplicate reference pictures in reference picture lists.

FIG. 45 is a flowchart illustrating a method in which the video encoder according to one embodiment of the present invention skips derivation of transformation information for the duplicate reference pictures in the reference picture list and skips creation of transformed information of the reference pictures. FIG. 46 is a flowchart illustrating a method in which the video decoder according to one embodiment of the present skips reception of transformation information for the duplicate reference pictures in the reference picture list and skips creation of transformed pictures of the duplicate reference pictures.

Referring to FIG. 45, the video encoder determines whether the composition of reference pictures in a current reference picture list is the same as the composition of reference pictures in a specific reference picture list (S4510).

When the composition of reference pictures in the current reference picture list is not the same as the composition of reference pictures in the specific reference picture list (No in S4510), the video encoder derives transformation information for the reference pictures in the current reference picture list (S4520). Next, the video encoder uses the derived transformation information to create transformed pictures of the reference pictures in the current reference picture (S4530).

Referring to FIG. 46, the video decoder determines whether the composition of reference pictures in a current reference picture list is the same as the composition of reference pictures in a specific reference picture list (S4610).

When the composition of reference pictures in the current reference picture list is not the same as the composition of reference pictures in the specific reference picture list (No in S4610), the video decoder receives the transformation information for the reference pictures in the current reference picture list (S4620). Next, the video decoder uses the derived transformation information to create transformed pictures of the reference pictures in the current reference picture (S4630).

The video encoder and the video decoder check the composition of reference pictures in each of multiple reference picture lists. When the composition of reference pictures in a current picture list is not the same as the composition of reference pictures in a specific reference picture list, the video encoder and the video decoder transmit and receive the transformation information for the reference pictures in the current reference picture list. That is, the video encoder checks the composition of reference pictures in each of multiple reference picture lists. When the composition of reference pictures in a current reference picture list is the same as the composition of reference pictures in a specific reference picture list, the video encoder skips transmission of transformation information for the reference pictures in the current reference picture list and creation of transformed pictures of the reference pictures. On the other hand, the video decoder checks the composition of reference pictures in each of multiple reference picture lists. When the composition of reference pictures in a current picture list is the same as the composition of reference pictures in a specific reference picture list, the video decoder skips reception of the transformation information for the reference pictures in the current reference picture list and creation of the transformed pictures of the reference pictures.

Figure 47:
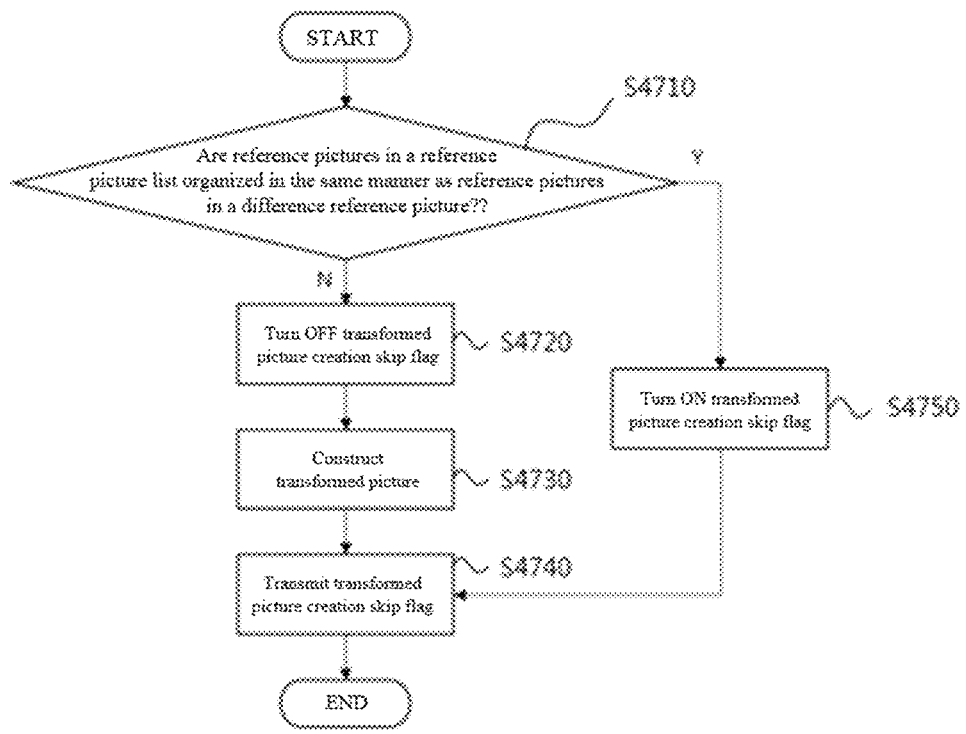
FIG. 47 is a flowchart illustrating a method in which a video encoder according to one embodiment of the present invention skips creation of transformed pictures of duplicate reference pictures in reference picture lists by using a flag.
Figure 48:
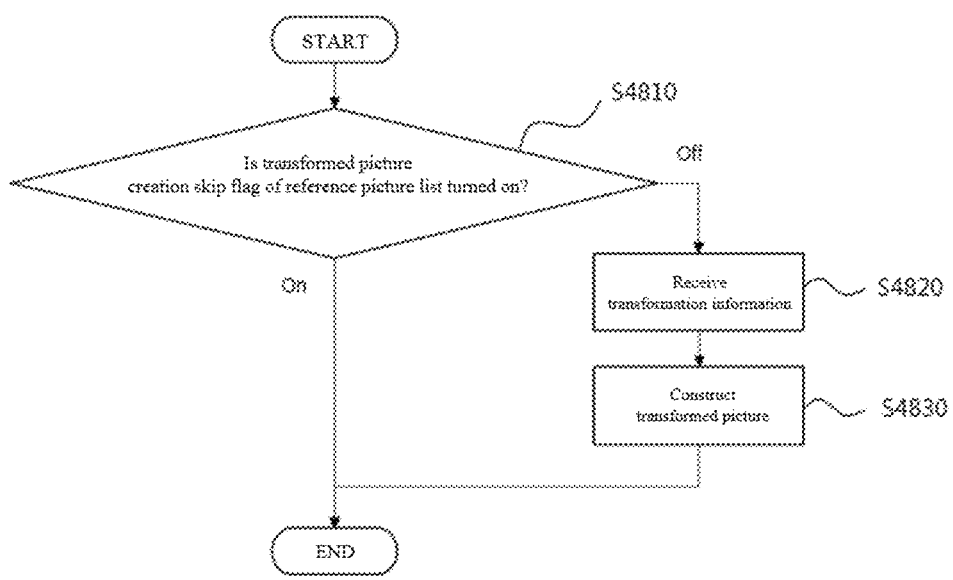
FIG. 48 is a flowchart illustrating a method in which a video decoder according to one embodiment of the present invention skips creation of transformed pictured of duplicate reference pictures in reference picture lists by using a flag.

FIG. 47 is a flowchart illustrating a method in which the video encoder according to one embodiment of the present invention skips creation of transformed pictures of reference pictures in a duplicate reference picture list composed of duplicate reference pictures by using a flag. FIG. 48 is a flowchart illustrating a method in which the video decoder according to one embodiment of the present invention skips creation of transformed pictures of the reference pictures within the duplicate reference picture list composed of duplicate reference pictures by using a flag.

A transmitted picture creation skip flag is defined to indicate whether to perform or skip the process of creating transformed pictures of reference pictures in a current reference picture list. The transformed picture creation skip flag is a value that is preset in the video encoder or the decoder or a value signaled to the video decoder from the video encoder.

For example, when the transformed picture creation skip flag has a first value, the process of creating transformed pictures of respective reference pictures within a current reference picture list. On the other hand, when the transformed picture creation skip flag has a second value, the process of creating transformed pictures of the reference picture in the current reference picture is performed. For example, the first value and the second value are 0 and 1, respectively or vice versa.

Referring to FIG. 47, the video encoder determines whether the composition of reference pictures in a current reference picture list is the same as the composition of reference pictures in another reference picture list (S4710).

When the composition of reference pictures in a current reference picture list is not the same as the composition of reference pictures in another reference picture list (No in S4710), the video encoder sets the transformed picture creation skip flag to the second value (S4720). The video encoder performs the process of creating transformed pictures of the reference pictures in the current reference picture list (S4730).

On the other hand, when a current reference picture is present in duplicate in a current reference picture list and another reference picture list (Yes in S4710), the video encoder sets the transformed picture creation skip flag to the first value (S4750).

Subsequently, the value of the transformed picture creation skip flag, which is determined in step S4720 or step S4750, is transmitted to the video decoder (S4740).

Referring to FIG. 48, the video decoder checks the value of the transformed picture creation skip flag transmitted from the video encoder (S4810).

When the transformed picture creation skip flag which is transmitted to the video decoder is set to the second value (Off in S4110), the video decoder receives the transformation information for the reference pictures contained in the current reference picture (S4820). Next, the video decoder uses the derived transformation information to create transformed pictures of the reference pictures contained in the current reference picture (S4830).

The video encoder checks the composition of reference pictures in each of multiple reference picture lists. When the composition of reference pictures in a current reference picture list is the same as the composition of reference pictures in another reference picture list, the video encoder sets the transformed picture creation skip flag to a first value for the reference pictures in the current reference picture list, transmits the transformed picture creation skip flag that is set to the second value to the video decoder, and skips the process of creating transformed pictures of the reference pictures included in the current reference picture list. On the other hand, when the composition of reference pictures in the current reference picture list is not the same as the composition of reference pictures in another reference picture list, the video encoder sets the transformed picture creation skip flag to a second value, transmits the transformed picture creation skip flag that is set to the second value, and performs the process of creating transformed pictures of the reference pictures. On the other hand, the video decoder receives the transformed picture creation skip flag, and skips or performs the transformed picture creation process depending on the value of the transformed picture creation skip flag.

The transformed picture creation process performed by the video encoder includes deriving transformation information for reference pictures contained in a current reference picture list, transmitting the transformation information to the video decoder, and creating transformed pictures of the reference pictures. The transformed picture creation process performed by the video decoder includes receiving the transformation information for the reference pictures contained in the current reference picture list and creating the transformed pictures of the reference pictures.

Figure 49:
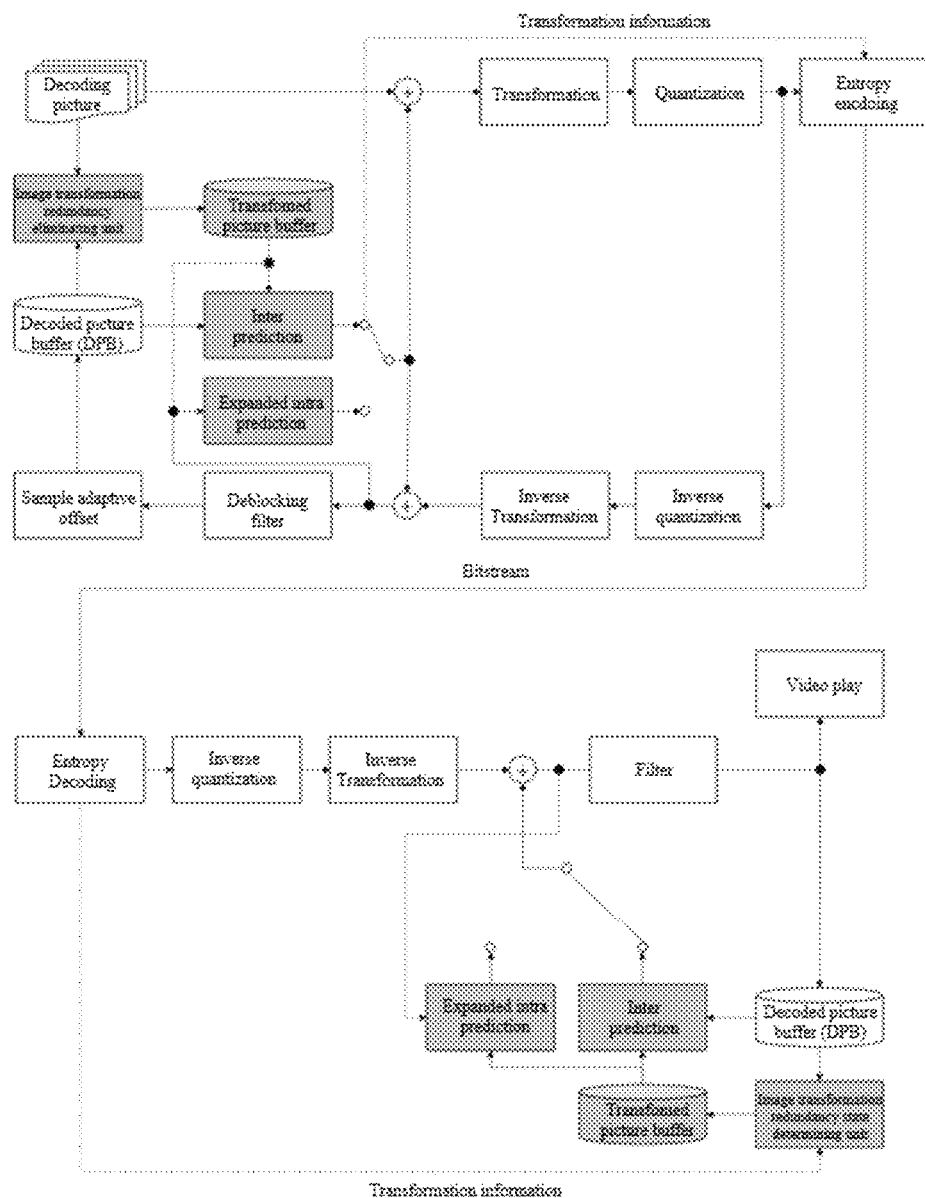
FIG. 49 is a diagram illustrating a video encoder and a video decoder according to one embodiment of the present invention.

FIG. 49 is a diagram illustrating a video encoder and a video decoder according to one embodiment of the present invention.

The encoder and decoder illustrated in FIG. 49 further includes an image transformation redundancy eliminating unit and an image transformation information redundancy state determining unit, respectively, compared to the encoder and decoder illustrated in FIG. 28.

The image transformation redundancy eliminating unit of the video encoder identifies duplicate reference pictures or duplicate reference picture lists from the decoded picture buffer (DBP) and enables the video encoder to avoid deriving duplicate transformation information, creating duplicate transformed pictures, encoding duplicate transformation information, and transmitting duplicate transformation information. In other words, an image transformation redundancy state determining unit illustrated in FIG. 49 is configured to perform at least one of the operations shown in FIGS. 35, 36, 37, 40, 42, 43, 45, and 47.

The image transformation redundancy state determining unit of the video decoder checks the flag and the reference picture composition information transmitted from the video encoder, determines whether the transformation information is received from the encoder, and enables the video decoder to avoid decoding of duplicate transformation information and creating duplicate transformed pictures. In other words, the image transformation redundancy state determining unit illustrated in FIG. 26 is configured to perform at least one operation of the operations shown in FIGS. 37, 39, 41, 44, FIGS. 46, and 48.

Several embodiments of the invention can be implemented in units of various sizes, for example, on a per picture basis, on a per slice basis, on a per tile basis, on a per tile group basis, or the like. Specifically, the transformed picture creation skip information is signaled at one or more levels selected from among a picture, a slice, a tile, and a tile group.

When the creation of a duplicate transformed picture is skipped, the previously created transformed picture is used as the transformed picture of the duplicate reference picture. For example, when transformed pictures of the reference pictures within a second reference picture list are created after transformed pictures of the reference pictures within a first reference picture list are created, and when one or more reference picture occur in duplicate in the first reference picture list and the second reference picture list, the transformed picture of the duplicate reference picture within the first reference picture list is used as the transformed picture of the duplicate reference picture in the second reference picture list without creating a duplicate transformed picture for the duplicate reference picture in the second reference picture list.

That is, a transformed picture that can be used as the transformed picture of a duplicate reference picture exists in a transformed picture list or a transformed picture buffer. Therefore, although a transformed picture of the duplicate reference picture is not newly generated, since the exiting transformed picture serves as the transformed picture of the duplicate reference picture, inter prediction efficiency is not deteriorated.

For example, referring to FIG. 30, since a transformed picture A', which is a transformed picture of a reference picture included in a reference picture list 1, has been already created, a transformed picture of a duplicate reference picture included within a reference picture list 2 is not newly generated. In this case, when inter prediction is performed by using the transformed picture of the duplicate reference picture included in the reference picture list 2, the inter prediction is performed with reference to the transformed picture A' associated with the reference picture list 1.

According to one aspect of the invention, an image decoding method includes: creating at least one transformed picture corresponding to at least one reference picture organized in a first reference picture list; identifying at least one reference picture that occurs in duplicate in a second reference picture list and in the first reference picture list, from among reference pictures organized in the second reference picture list; and creating transformed pictures corresponding to the other reference pictures organized in the second reference picture except for the reference picture that occurs in duplicate in both of the first reference picture list and the second reference picture list.

According to the invention, the image decoding method further includes decoding transformation information for at least one reference picture organized in the first reference picture list.

According to the invention, the image decoding method further includes decoding transformation information for the remaining reference pictures organized in the second reference picture except for the duplicate reference picture.

According to the invention, the image decoding method further includes creating a transformed reference picture list by using the created transformed pictures.

According to another aspect of the invention, an image encoding method includes: creating at least one transformed picture corresponding to at least one reference picture organized in a first reference picture list; identifying at least one reference picture that occurs in duplicate within the first reference picture list and a second reference picture list, from among multiple reference pictures organized in the second reference picture list; and creating transformed pictures corresponding to the remaining reference pictures organized in the second reference picture list, except for the reference picture that occurs in duplicate within the first reference picture list and within the second reference picture list.

According to the invention, the image encoding method further includes encoding transformation information for at least one reference picture organized in the first reference picture list.

According to the invention, the image encoding method further includes encoding transformation information for the remaining reference pictures within the second reference picture except for the reference picture that occur in duplicate in the first reference picture list and the second reference picture list.

According to the invention, the image encoding method further includes creating a transformed reference picture list into which the created transformed pictures are organized.

According to the invention, the image encoding method further includes encoding transformed picture creation skip information indicating the remaining reference pictures organized in the second reference picture except for the reference picture that is in duplicate in the first reference picture list and the second reference picture list.

According to a further aspect of the invention, an image decoding method includes: creating at least one transformed picture corresponding to at least one reference picture organized in a first reference picture list; obtaining transformed picture creation skip information; selecting at least one reference picture from among reference pictures organized in a second reference picture list on the basis of the transformed picture creation skip information; and creating transformed pictures corresponding to the remaining reference pictures except for the at least one selected reference picture, among the reference pictures organized in the second reference picture list.

According to the invention, the image decoding method further includes decoding transformation information for at least one reference picture organized in the first reference picture list.

According to the invention, the image decoding method further includes decoding transformation information for the remaining reference pictures except for the at least one selected reference picture among the reference pictures organized in the second reference picture list.

According to the invention, the image decoding method further includes creating a transformed reference picture list into which the created transformed pictures are organized.

According to a yet further aspect of the invention, an image decoding method includes: creating at least one transformed picture corresponding to at least one reference picture organized in a first reference picture list; determining whether reference pictures organized in the first reference picture list are the same as reference pictures organized in a second reference picture list; and creating at least one transformed picture corresponding to at least one reference picture organized in the second reference picture list only the determination result reveals that the reference pictures organized in the first reference picture list are different from the reference pictures organized in the second reference picture list.

According to a yet further aspect of the invention, an image encoding method includes creating at least one transformed picture corresponding to at least one reference picture organized in a first reference picture list, determining whether the reference pictures in the first reference picture list are the same as reference pictures in a second reference picture list, and creating at least one transformed picture corresponding to at least one reference picture in the second reference picture list only when the determination result reveals that the reference pictures in the first reference picture list are different from the reference pictures in the second reference picture list.

A computer-readable recording medium according to an aspect of the invention stores a bitstream created by the video encoding method and/or apparatus according to the invention.

Although the exemplary methods of the present disclosure are represented by a series of steps for clarity of description, they are not intended to limit the order in which the steps are performed. That is, if necessary, each step may be performed in parallel or performed in series in a different order. In order to implement the method according to the present disclosure, each of the embodiments described above can be modified such that some additional steps can be added to a corresponding embodiment or some existing steps can be eliminated from a corresponding embodiment. Alternatively, some additional steps are added and some existing steps are eliminated from a corresponding of the embodiments.

Various embodiments in the present disclosure are not intended to represent all of the possible combinations based on technical spirit of the present invention but are provided only for illustrative purposes. Elements or steps described in various embodiments can be applied independently or in combination.

Various embodiments in the present disclosure can be implemented by hardware, firmware, software, or a combination thereof. When implemented by hardware, each of the embodiments can be implemented by one or more application specific integrated circuits (ASICs), digital signal processors (DSPs), digital signal processing devices (DSPDs), programmable logic devices (PLDs), field programmable gate arrays (FPGAs), general processors, controllers, micro controllers, or micro-processors.

The scope of the present disclosure covers software or machine-executable commands (for example, operating systems (OSs), application programs, firmware, programs) that enable steps in various embodiments to be performed in a certain device or computer, and a non-transitory computer-readable medium in which such software or commands are stored so as to be executable in a certain device or computer when read out.

What is claimed is:

1. A method of decoding an image, the method comprising:
    decoding transformation information for a current block;
    generating a first reference picture and a second reference picture list for the current block;
    generating at least one transformed reference picture by applying the transformation information to at least one reference picture included in a first reference picture list;
    including the at least one transformed reference picture into the first reference picture list;
    generating a first prediction signal of the current block by using the transformed reference picture of the first picture list;
    generating a second prediction signal of the current block by using a non-transformed reference picture of the second reference picture list; and
    generating a final prediction signal of the current block by applying a weighted sum to the first prediction signal and the second prediction signal.

2. The method according to claim 1, further comprising:
    wherein the step of including the at least one transformed reference picture into the first reference picture list further comprises:
        determining whether to include the transformed reference picture into the first reference picture list on the basis of transformed reference picture utilization information; and
        including the at least one transformed reference picture into the first reference picture list according to the determination result.

3. The method according to claim 1, wherein the transformed reference picture is included after the at least one reference picture in the first reference picture list.

4. The method according to claim 1, wherein the at least one transformed picture is generated using a reference picture at a predetermined position in the first reference picture list.

* * * * *